(12) United States Patent
Stone

(10) Patent No.: US 10,081,446 B2
(45) Date of Patent: Sep. 25, 2018

(54) SYSTEM FOR EMERGENCY CREW RETURN AND DOWN-MASS FROM ORBIT

(71) Applicant: William C. Stone, Del Valle, TX (US)

(72) Inventor: William C. Stone, Del Valle, TX (US)

( * ) Notice: Subject to any disclaimer, the term of this patent is extended or adjusted under 35 U.S.C. 154(b) by 597 days.

(21) Appl. No.: 15/067,292

(22) Filed: Mar. 11, 2016

(65) Prior Publication Data

US 2016/0264266 A1  Sep. 15, 2016

Related U.S. Application Data

(60) Provisional application No. 62/131,405, filed on Mar. 11, 2015.

(51) Int. Cl.
*B64G 1/62* (2006.01)
*B64G 1/58* (2006.01)
(Continued)

(52) U.S. Cl.
CPC ............... *B64G 1/62* (2013.01); *B64G 1/12* (2013.01); *B64G 1/222* (2013.01); *B64G 1/58* (2013.01);
(Continued)

(58) Field of Classification Search
CPC ................... B64G 1/58; B64G 1/62
See application file for complete search history.

(56) References Cited

U.S. PATENT DOCUMENTS 3,105,658 A * 10/1963 Marshall .............. B64G 1/62
244/113
3,119,576 A * 1/1964 Nielsen .............. B64G 1/24
244/159.1

(Continued)

FOREIGN PATENT DOCUMENTS

JP   2001132542 A   5/2001
JP   2002193555 A   7/2002

OTHER PUBLICATIONS

Dughaish, Z.H., Lead telluride as a thermoelectric material for thermoelectric power generation, Physica 8: Condensed Matter, vol. 322, Issues 1-2, 2002, pp. 205-223.

(Continued)

*Primary Examiner* — Brian M O'Hara
*Assistant Examiner* — Michael B. Kreiner
(74) *Attorney, Agent, or Firm* — Miguel Villarreal, Jr.; Gunn, Lee & Cave, P.C.

(57) ABSTRACT

A system for emergency crew return and down-mass orbit comprising a stowable, self-contained, deployable maneuvering reentry vehicle for automated, on-demand reentry to ground for cargo of 1-10 kilograms or up to single or multiple human use for evacuation of orbital facilities. The system includes a deployable "aeroshell" that is contiguous (a single geometric object—surface or hollow shape—that can morph in 3D shape), modular (a collection of modular components externally acting as a contiguous shape, but morphed in 3D via actuators contained in each modular member to create a general asymmetric geometry), or discontiguous (a collection of independently controlled surfaces or bodies that morph to form desirable asymmetric drag configurations). The system contains traditional spacecraft guidance, navigation and control, propulsion, and attitude control elements, in addition to communications, power, and actuator energetics systems for controlling the vehicle aeroshell shape during reentry, thus, minimizing the landing footprint of the vehicle.

15 Claims, 26 Drawing Sheets

(51) Int. Cl.
  B64G 1/12 (2006.01)
  B64G 1/22 (2006.01)
  B64G 1/64 (2006.01)
  B64G 1/52 (2006.01)
  B64G 1/26 (2006.01)
  B64G 1/36 (2006.01)
  B64G 1/66 (2006.01)

(52) U.S. Cl.
  CPC ............... *B64G 1/646* (2013.01); *B64G 1/26* (2013.01); *B64G 1/36* (2013.01); *B64G 1/361* (2013.01); *B64G 1/66* (2013.01); *B64G 2001/525* (2013.01)

(56) References Cited

U.S. PATENT DOCUMENTS

| | | | |
|---|---|---|---|
| 3,512,736 A * | 5/1970 | Anderson | B64G 1/422 136/202 |
| 3,753,537 A | 8/1973 | Karpa et al. | |
| 3,815,511 A | 6/1974 | Staal | |
| 3,825,211 A | 7/1974 | Minovitch | |
| 4,504,031 A * | 3/1985 | Andrews | B64G 1/62 244/110 D |
| 4,518,137 A * | 5/1985 | Andrews | B64G 1/62 244/110 D |
| 4,860,968 A | 8/1989 | Pinson | |
| 5,022,603 A | 6/1991 | Maree et al. | |
| 5,039,193 A | 6/1991 | Snow et al. | |
| 5,044,573 A | 9/1991 | LeCompte | |
| 5,058,969 A | 10/1991 | Peterson et al. | |
| 5,074,489 A | 12/1991 | Gamzon | |
| 5,080,306 A * | 1/1992 | Porter | B32B 15/14 244/171.7 |
| 5,099,144 A | 3/1992 | Sai | |
| 5,108,046 A * | 4/1992 | Chaumette | B64G 1/62 244/110 D |
| 5,108,047 A * | 4/1992 | Puech | B64G 1/62 244/113 |
| 5,248,931 A | 9/1993 | Flesner et al. | |
| 5,260,639 A | 11/1993 | De Young et al. | |
| 5,310,134 A | 5/1994 | Hsu et al. | |
| 5,436,553 A | 7/1995 | Pepper et al. | |
| 5,502,356 A | 3/1996 | McGeoch | |
| 5,564,649 A | 10/1996 | Von Hoessle et al. | |
| 5,686,694 A | 11/1997 | Hillenbrand et al. | |
| 5,748,102 A | 5/1998 | Barron | |
| 6,167,831 B1 | 1/2001 | Watt et al. | |
| 6,223,675 B1 | 5/2001 | Watt et al. | |
| 6,257,162 B1 | 7/2001 | Watt et al. | |
| 6,262,357 B1 | 7/2001 | Johnson et al. | |
| 6,264,144 B1 * | 7/2001 | Thornton | B64G 1/58 244/113 |
| 6,307,156 B1 | 10/2001 | Avellanet | |
| 6,390,012 B1 | 5/2002 | Watt et al. | |
| 6,407,535 B1 | 6/2002 | Friedman et al. | |
| 6,411,565 B1 | 6/2002 | Sirmalis et al. | |
| 6,488,233 B1 | 12/2002 | Myrabo | |
| 6,491,258 B1 | 12/2002 | Boyd et al. | |
| 6,534,705 B2 | 3/2003 | Berrios et al. | |
| 6,669,126 B1 | 12/2003 | Albert et al. | |
| 6,828,579 B2 | 12/2004 | Ghamaty et al. | |
| 6,910,658 B1 | 6/2005 | Hart et al. | |
| 6,914,343 B2 | 7/2005 | Hiller et al. | |
| 6,964,509 B2 | 11/2005 | Gozum et al. | |
| 6,968,112 B2 | 11/2005 | Zamel et al. | |
| 7,263,245 B2 | 8/2007 | Delcher et al. | |
| 7,342,170 B2 | 3/2008 | Ghamaty et al. | |
| 7,356,209 B2 | 4/2008 | Delcher et al. | |
| 7,540,265 B2 | 6/2009 | Willems et al. | |
| 7,837,154 B2 * | 11/2010 | Trabandt | B64G 1/62 244/159.1 |
| 8,733,706 B1 * | 5/2014 | Fernandez | B64G 1/222 244/139 |
| 8,876,059 B2 * | 11/2014 | Featherstone | B64G 1/002 244/158.9 |
| 9,522,747 B2 * | 12/2016 | Coleman | B64D 17/80 |
| 9,656,769 B2 * | 5/2017 | Mazed | D03D 25/005 |
| 9,884,693 B2 * | 2/2018 | Nock | B64G 1/62 |
| 2002/0046763 A1 | 4/2002 | Berrios et al. | |
| 2003/0111660 A1 | 6/2003 | Ghamaty et al. | |
| 2004/0149485 A1 | 8/2004 | Edwards | |
| 2004/0163709 A1 | 8/2004 | Baugh et al. | |
| 2004/0163802 A1 | 8/2004 | Baugh et al. | |
| 2004/0182732 A1 | 9/2004 | Zamel et al. | |
| 2004/0238022 A1 | 12/2004 | Hiller et al. | |
| 2005/0028857 A1 | 2/2005 | Ghamaty et al. | |
| 2005/0126624 A1 | 6/2005 | Pellizzari | |
| 2006/0289724 A1 | 12/2006 | Skinner et al. | |
| 2007/0056262 A1 | 3/2007 | Leach et al. | |
| 2008/0056642 A1 | 3/2008 | Byer et al. | |
| 2008/0134952 A1 | 6/2008 | Tull | |
| 2009/0086309 A1 | 4/2009 | Moosburger | |
| 2009/0206697 A1 | 8/2009 | Marshal Bruce et al. | |
| 2009/0251271 A1 | 10/2009 | Stelzer et al. | |
| 2009/0296746 A1 | 12/2009 | Heaton et al. | |
| 2010/0044103 A1 | 2/2010 | Moxley et al. | |
| 2010/0044106 A1 | 2/2010 | Zediker et al. | |
| 2010/0215326 A1 | 8/2010 | Zediker et al. | |
| 2010/0275576 A1 | 11/2010 | Gutman et al. | |
| 2012/0068086 A1 | 3/2012 | DeWitt et al. | |

OTHER PUBLICATIONS

Hecht, Jeff, Photonic Frontiers: Photonic power delivery: Photonic power conversion delivers power via laser beams, 2006, Laser Focus World, available at https://www.laserfocusworld.com/articles/print!volume-42/issue-1/features/photonic-frontiersphotonic-power-delivery-photonic-power-conversion-delivers-power-via-laser-beams.html.

Hussein, H., A novel delivery for laser thermal recanalization, Images of the Twenty-First Century. Proceedings of the Annual International Engineering in Medicine and Biology Society, Seattle, WA, 1989, pp. 1190-1191 vol. 4.

Lorenz, R.D., Subsurface ambient thermoelectric power for moles and penetrators, 2003 IEEE Aerospace Conference Proceedings (Cat. No. 03TH8652), 2003, pp. 2_637-2_642.

Ritz et al., Multi-mission radioisotope thermoelectric generator (MMRTG) program overview, 2004IEEE Aerospace Conference Proceedings (IEEE Cat. No. 04TH8720), 2004, pp. 2957 vol. 5.

* cited by examiner

SYSTEM FOR EMERGENCY CREW RETURN AND DOWN-MASS FROM ORBIT

CROSS REFERENCE TO RELATED APPLICATIONS

This original non-provisional application claims priority to and the benefit of U.S. provisional application Ser. No. 62/131,405, filed Mar. 11, 2015, and entitled "System for Emergency Crew Return and Down-Mass from Orbit," which is incorporated by reference herein.

STATEMENT REGARDING FEDERALLY SPONSORED RESEARCH OR DEVELOPMENT

None.

BACKGROUND OF THE INVENTION

1. Field of the Invention

The present invention relates to reentry vehicles (RV). More specifically, the present invention relates to the field of low ballistic coefficient (BC) reentry vehicles (RV)—devices and systems that can be used to return objects and humans from orbit (e.g., low Earth orbit or LEO) to ground—and for aerobraking and aerocapture maneuvers in which a space vehicle, for example, in interplanetary space or in cis-lunar space in the Earth-Moon system, makes single or multiple passes through a planetary upper atmosphere to slow its velocity and allow it to enter into a desired orbit around that planet.

2. Description of the Related Art

The aerothermodynamic environment a reentry vehicle will experience is directly related to the velocity it is traveling at and the immediate density of the atmosphere along its reentry trajectory, i.e., where it is passing through. The altitude at which the predominant portion of deceleration takes place determines the density of the free stream atmosphere encountered by the vehicle. In general, the higher in the atmosphere that a reentry vehicle can commence deceleration, the lower will be the heat loading rate (expressed in watts/cm$^2$).

Neglecting lift for the moment, the center of the entry corridor is defined by the nominal ballistic entry and determined by the vehicle's entry velocity and ballistic coefficient. The ballistic coefficient $C_B$ is a useful metric for assessing likely thermal loading during reentry and is expressed as the following equation:

$$C_B = (m/(C_d \cdot A)) \quad (I)$$

where $C_B$ is the ballistic coefficient, m is the total mass of the vehicle, $C_d$ is the vehicle drag coefficient, and A is the reference area, typically defined by maximum diameter.

For a given initial entry velocity, as the ballistic coefficient is increased, the vehicle descends deeper into the atmosphere and decelerates at lower altitudes. Thus, the ballistic coefficient is the dominant factor in determining the density profile that the vehicle encounters and significantly affects the severity of the aerothermodynamics environment.

The heating experienced by a vehicle is due to two modes of energy transfer from the flow field to the vehicle surface: convection and radiation. In general, convective heating is dominant for vehicles with a small nose radius, inversely proportional to the square root of the nose radius and directly proportional to the square root of the freestream density. Whereas, radiative heating is dominant for blunt vehicles at higher velocities where the flow field energy is sufficiently high, directly proportional to the nose radius and proportional to the freestream density to a power greater than one. Thus, for a given vehicle mass and entry velocity, heating can be reduced by decreasing the ballistic coefficient via increasing the vehicle size for a given mass. By reducing the ballistic coefficient, the vehicle flies a trajectory where a significant portion of the delta-V occurs higher in the atmosphere and, thus, at a lower density.

Convective heating is reduced by both the increased nose radius resulting from the larger vehicle size and the decrease in density. Radiative heating is potentially increased by the increase in nose radius but this effect is more than offset by the decrease in density resulting from the higher altitude trajectory. Therefore, to reduce the total heating to which a vehicle is subjected, it is desirable have an entry configuration with a low ballistic coefficient. The added benefit of a low ballistic coefficient entry configuration is that such configuration can reduce the overall heating to the point where a reusable thermal protection system (TPS) is achievable. Reduction of overall heating (to where TPS is achieved) is one of the primary objectives of the present invention. Importantly, a crucial and novel addition is the ability to dynamically maneuver throughout the reentry trajectory.

None of the vehicles in the prior art are dynamically maneuvering, that is, under active control, during reentry. They instead follow a ballistic trajectory defined by, among other things, the variances of the temperature and pressure of the atmosphere, the entry angle and ballistic coefficient. As a result, the landing footprint for such vehicles tends to be large. It is an explicit objective of the proposed invention to reduce the circular error probable of the landing zone to the smallest achievable number, nominally to within several hundred meters of a designated landing zone.

There are two general classes of designs in use today for reentry thermal protection systems (TPS): rigid systems and non-rigid systems. The vast majority of vehicles designed to date have relied upon rigid TPS. For small payloads it is possible to use a heat sink design. This approach, which utilizes thick segments of refractory metals for the TPS, has been in use for decades for data recovery from reconnaissance satellites requiring return of film canisters. This design employs a preponderant mass within the absorber shell and is considered untenable for large payload return to Earth. Ablative TPS were used for all United States manned missions through Apollo and have been used for unmanned and manned missions, such as the Galileo probe to Jupiter and the Space Exploration Initiative (SEI) probe to Mars, respectively, where reusability was not a design criterion.

The second general class of TPS is a nonrigid/deployable system. These systems offer the advantage of being designable with a low enough ballistic coefficient to reap the benefits stated previously. A subset of this class is inflatable systems. The concept of an inflatable aerodynamic decelerator has been around since the 1950's and variations of these so-called "ballutes" (balloon-parachutes) have been used in aviation and have been tested in high altitude sounding rockets.

Inflatable concepts have been exploited in a number of recent designs, the most publicized of which were the 2000 and 2002 launches of the Russian-Daimler-Benz Aerospace (DASA) and Russian-European Space Agency (ESA) Inflatable Reentry and Descent Technology (IRDT)-1 and IRDT-2 micro RV secondary payloads. The IRDT aeroshells measured 800 mm diameter and 700 mm height in the stowed configuration and 3.8 m diameter in the fully inflated configuration. The Russian Fregat primary upper stage in the 2000 test was itself returned via an inflatable aeroshell. The reentry first stage inflation achieved a diameter of 8 m with a second stage decelerator expanding to 14 m.

The first IRDT mission was performed on Feb. 9, 2000, by using the first Soyuz-Fregat test flight as a piggy-back launch opportunity. The results of this experiment were mixed. After launch from Baikonur and six orbits, the re-entry sequence was initiated and the IRDT vehicle apparently successfully deployed the first stage inflatable TPS but failed to deploy the second stage and crashed at >60 m/s. The Fregat system, initially lost, was recovered but had been vandalized and only limited information was obtained.

IRDT-2 was launched on a suborbital flight on Jul. 12, 2002 from a Russian submarine in the Barents Sea near Murmansk on board a converted Volna SS-N-18 intercontinental ballistic missile. However, due to a failure in the launcher/payload interface, IRDT-2 did not land in the expected nominal area on the Kamchatka peninsula and could not be activated. Further conclusions towards the IRDT system were not possible.

The objective of the second IRDT test flight was to verify the enhanced system concept under representative orbital conditions (7 km/s entry velocity, −6.9 degrees entry angle). In accordance with the recommendations of the IRDT-1 flight evaluation, certain refinements were implemented, e.g., improvements to the shield design and the internal pressure control and monitoring, introduction of a telemetry system for the landing phase and an enriched sensor package providing the flight evaluation data. The total mass amounted to approx. 140 kg.

Although the performance of this system remains to be firmly established, largely due to flight deployment problems, follow-on variations have been proposed by the Russian-ESA alliance for return of payloads from the ISS.

Similar designs were prototyped by NASA Langley over the past decade under the name Inflatable Reentry Vehicle Experiment (IRVE) and flown on Black Brant sounding rocket sub-orbital tests with ultimately successful results with temperatures experienced during the flights closely following theory and validating the predicted aerothermal behavior of low ballistic coefficient reentry vehicles.

In the United States, inflatable ballutes have been proposed for several planetary missions. For example, the Mars Surveyor (2003/2005) ballute study, conducted by ILC Dover and LMA), has considered the design of a toroidal inflatable ballute and attached aeroshell that is jettisoned once the vehicle achieves the desired velocity shedding. The ballute was designed for a 300-second operation duration, a maximum dynamic pressure 1.18 psi and an internal pressure of 2.4 psi. Zylon® 2000 was selected as the primary fabric for the ballute and was coated with LT-50 silicone. The TPS consisted of two outer layers of Nextel® 312 and 1 inner layer of Fiberfrax ceramic felt.

Although inflatable systems can be a viable option for a single-use aerocapture or entry, descent and landing TPS system, reusability is questionable. The major concern is the risk associated with the ability to stow the system between usages to protect the inflatable aeroshell from debris and micrometeorite damage.

Another option for a deployable non-rigid TPS system is the reentry aeroshells developed by ILC Dover and Ball Aerospace for candidate Mars micro-mission scenarios. Inflatable stiffeners were used to deploy a high temperature fabric. A second approach was developed using sprung composite rods to "unfurl" the stowed aerobrake. A final example of deployable reentry vehicles using stretched fabric is the canister deployment of the second stage of the NASA SOAREX reentry vehicle known as a Tube Deployed Reentry Vehicle (TDRV). The TDRV uses four stiffening panels that unfold when the vehicle is ejected from its carrying canister. These stiffening panels in turn serve as semi-rigid restraints for four lobes of a refractory fabric that trail behind the vehicle. Unlike the present invention, the prior art vehicles just described have the bulk of the mass of the reentry vehicle in front of the deployed drag surface.

To make orbital operations (e.g., in low Earth orbit—LEO) safer and more commercially viable for the private sector, a means of bringing mass back down to Earth more frequently and at much lower cost is required. Such a capability would be enabling for low- and zero-gravity manufactured products, e.g., pharmaceuticals, requiring regular delivery to customers who cannot wait the lengthy periods that presently exist with government-sponsored space program vehicles. Accordingly, there is a need for an operational on-demand, low cost, compact, small landing footprint capability will provide nascent space-manufacturing and space tourism industries with an off-shelf option for on-demand return of products, and for improving mission survivability and the security of their paying passengers.

BRIEF SUMMARY OF THE INVENTION

The present invention is a system for emergency crew return and down-mass from orbit.

The present invention consists of a highly compact, extremely lightweight, maneuverable, deployable system for automated, on-demand reentry to ground with cargo or people.

The present invention is centered around a deployable "aeroshell" (sometimes called a "heat shield") that can be contiguous (a single geometric object—surface or hollow shape—that can morph in 3D shape), modular (a collection of modular components that externally act as a contiguous shape, but can be morphed in 3D by means of actuator elements contained in each modular element to create a general asymmetric geometry), or is discontiguous (a collection of independently controlled surfaces or bodies that morph to form desirable asymmetric drag configurations). This core element then contains traditional spacecraft guidance, navigation and control (GN&C), propulsion, and attitude control elements, plus communications, power, and actuator energetics systems for controlling the shape of the vehicle aeroshell.

The present invention describes a highly compact, extremely lightweight, maneuverable, deployable system for automated, on-demand reentry to ground for cargo initially in the 1 kilogram range and scaling up to systems rated for single or multiple human use. The systems of the present invention described herein are scalable from test articles that carry small high-value scientific payloads to ground from an orbiting facility (e.g., the International Space Station—ISS) to a system large enough to bring 3 or more crew members down from LEO in the case of a medical emergency or facility/spacecraft disaster on orbit. The invention is a modular, maintainable device that can be mass-manufactured to achieve economy of scale, and which is small and lightweight enough to serve as stowable gear on crewed launches, as well as for evacuation of orbital facilities.

Within the next decade it is highly likely that private crewed commercial transport to LEO, initially for government customers, and later to service growing demand for space tourism, will eclipse government space activity. None of these efforts, whether launch-related (e.g., SpaceX, Virgin Galactic, etc.) nor orbital facility-related (e.g., Bigelow)

have confronted the issue of emergency crew abort from orbit, other than to assume that the launch and re-supply vehicles will provide this service. Nothing like the present invention is available or planned today.

In the meantime, a potentially disastrous safety situation currently exists within the U.S. space program. The ISS is equipped with a 3-person Soyuz spacecraft (the same vehicle that carries crew to the ISS) that takes significant time to enter and prepare for departure, rendering escape in an emergency doubtful—a situation forcing ISS mission planners to settle for three (3) crew members on orbit even though ISS is designed and intended to house a far larger and more productive team. In brief, commercial crewed launch vehicles, and government-owned capsule-type spacecraft have no abort options from orbit in the event of damage to their reentry shields, e.g., serious tile strike during launch, other than to rendezvous with the ISS, assuming it happens to be in a proximal orbital plane. Under current conditions, a significant debris or meteoroid strike on the ISS or a collision with a spacecraft that compromised both systems while occupied by any more than the minimal three (3) person crew would be catastrophic—there are no orbital "lifeboats."

Concepts for an orbital "lifeboat" have been around for decades. Most of these programs failed because of excessive cost and complexity and internal politics. However, none tried to solve the problem in a minimalist fashion by confronting the fundamental issue: How is it possible to get people (and high-value payload) down from orbit on-demand, with rapid shirt sleeve entry, in an economical, compact, lightweight and automated vehicle? While cheap access to space has proven elusive, inexpensive, compact, on-demand and stowable reentry lifeboats are long overdue.

On a more operational front, aside from infrequent visitation by the government-owned capsule-type spacecraft, the ISS has no on-demand down-mass recovery capability from orbit. Such a capability for small (1 to 10 kg) science payloads from the ISS or an orbiting industrial facility would enable ground-based labs to examine interesting and time sensitive (e.g., biological specimen) test results using more sophisticated instrumentation than is available on orbit. Such capabilities are also needed for regular delivery of produced-in-space pharmacological products.

An operational on-demand, low cost, compact, small landing footprint capability will provide nascent space-manufacturing and space tourism industries with an off-shelf option for on-demand return of products, and for improving mission survivability and the security of their paying passengers.

Bringing items from orbit to Earth intact has heretofore been difficult and costly due to the extreme conditions of high ballistic coefficient ($C_B$) reentry and the consequent complexity and cost of vehicles capable of both withstanding high reentry thermal and structural loading and of landing their cargo safely. The current common thinking asserts that items must be brought back to Earth in the same or similar vehicles as the ones that carried those items into orbit. Sticking with the current paradigm requires down-mass capabilities be driven by launch schedules and available stowage in those vehicles. This limits, for example, the ISS's potential as a scientific laboratory and limits the versatility and commercial viability of eventual private orbital facilities, e.g., hotels, workshops, pharmacological manufacturing facilities, fuel depots and the like. While the types of vehicles needed to loft items into orbit may essentially remain the same for some time, the same is not true regarding how product return from space and emergency recovery of humans from space need to be done.

The launch and on-orbit storage mass and size of any independent emergency or on-demand auxiliary reentry vehicle must be reduced significantly to justify the cost of launching them into space in the first place and to make it feasible to store them on-orbit for long term use. The invention described herein is lightweight, compact, stowable for long periods in space and will be economical enough to be stored in quantity on the ISS, on human-rated capsules, and on emerging LEO industrial facilities. Several embodiments of such a compact, low mass, deployable, maneuverable reentry systems are described below. All involve combinations of flexible fabric and rigid panel elements, both for the aeroshell and crew/payload pod, with a variety of deployment mechanisms. All operate in the design space where $1<C_B<20$, assuring that peak stagnation point heating falls into a zone where refractory fabrics are viable for aeroshell elements. In one embodiment, a sub-scale flight test article designed to return 10 kg from LEO fits in a volume of approximately ½ cubic meters—small enough to be EVA-deployed by a space-suited astronaut from the ISS or as a secondary payload on an expendable launch vehicle (ELV). In an alternative embodiment, a 3-person crewed version fits in a compacted volume between 2 to 3 cubic meters and under 200 kg mass, including dry structure, aeroshell volume and crew pod, deployment systems, propellant, avionics, sensors, actuators, life support and guidance, navigation, and control systems (GN&C).

Importantly, deployable reentry vehicles of the present invention, as described in detail below, are capable of reentry and landing autonomously, with minimal man-in-the-loop control. In one embodiment, the present invention allows shirt-sleeved (not in a spacesuit) crew to rapidly enter the vehicle, push a button to activate the system (i.e., "one-touch-button" reentry) and have the vehicle do the rest. In another embodiment, a 1-10 kg down-mass variant of the system is small enough to deploy through an airlock on the ISS; man-rated versions would dock to spare airlocks for shirt-sleeve emergency egress from ISS. Both of these scenarios are well within the capability of current robotic systems technology developed by the inventor, yet such simplicity of operation remains to be implemented in a space vehicle. The inventor believes a clear opportunity exists to do so. The emphasis in the latter design is on rapid crew entry followed by a very simple arming and deployment mechanism, so that extensive pre-departure sequencing is not required. For safety reasons the retro burn (de-orbit rocket firing) is achieved by using a sustained operation of the onboard RCS (reaction control system, or "attitude control") thruster system with high pressure cold gas as the propellant; not flammable propellants.

Unlike prior low-$C_B$ reentry vehicle concepts, such as ballutes, inflatable reentry and descent technology (e.g., the Russian Inflatable Reentry and Descent Technology (IRDT) efforts and, recently, the NASA Inflatable Reentry Vehicle Experiment (IRVE) sub-orbital experiments), the invention disclosed herein is an intelligent, reactive, modular, re-usable active hypersonic-maneuvering, variable L/D (lift/drag) system with a very small landing circular error probable (CEP) and dramatically reduced g-loading. The present invention achieves this through an array of real-time aft-aeroshell adjustable aileron/flap surfaces distributed around the otherwise axisymmetric shell of revolution as well as through alternate activation systems, to be described below, that change the overall shape of the entire aeroshell in an asymmetric fashion. Active maneuvering is achieved by creating asymmetric lift and drag through the aft surfaces which are identical, except for their firmware encoding and through alternate actuator morphing of the generalized shape of the aeroshell. Both down-range (advanced and retarded; ascending or descending) and cross-range (lateral, left or right) maneuvering can be accomplished in this fashion. The ability to actively shift the payload center of gravity is also possible with this architecture and can be used as one part of a control system used to achieve the L/D levels needed to reduce g-loading to levels sufficiently low to permit evacuation of injured personnel and to create the assymetric lift needed for maneuvering. Un-vectored RVs of this class with no active maneuvering (which includes ALL prior art) generally see peak decelerations of around 8 g's; this can be halved with an L/D of 0.1. Control surface sizing to produce sub-3 g loading (tolerable by injured humans) can be achieved with the invention herein described.

Like other low-$C_B$ concepts, advantage is taken of significantly reduced maximum heat loading rates, allowing maximum use of materials, such as Nextel or carbon composites, that are inherently more robust and lighter than traditional rigid ablative and dissipative approaches to thermal protection systems (TPS) that have traditionally been used in all prior spacecraft.

The present invention uses commercially available high temperature resistant woven ceramic and industrial fabrics, such as Nextel®. However, other similar materials capable of tolerating sustained temperatures of up to 1800° F. while retaining significant tensile strength (2000 MPa) may also be used and still be within the contemplation of the present invention.

Because the invention described herein is inherently axisymmetrical in its native state, economy of scale is automatically engendered in the design by creating the system from a plurality of identical modular segments. This allows for manufacturing simplicity and quality control as well as on-orbit panel replacement if required. A modular designed aeroshell consists of multiple radially axisymmetric elements assembled to produce an axisymmetric shell which resembles a head shield in its non-morphed native state. Both the reentry vehicles of the past and those currently under consideration by the private sector can effectively be considered custom designed, complex, one-off production items that are very expensive, non-maneuverable and non-scalable in size, weight and performance. Inexpensive vehicles are needed with component commonality and flexibility in use (e.g., modular, disposable, or repairable subsystems).

Development and production of the invention described herein can be completed in a much shorter time and with significantly fewer resources than a comparable crewed launch vehicle effort because the present invention is not its own launch vehicle. It is launched into orbit inside, not on, traditional launch vehicles. No one has ever attempted bringing along orbital lifeboats along with a manned space shot. Making them small enough (and light weight enough) allows the reentry vehicles of the present invention to be stowed in an equipment locker, or under or behind crew seats (in a fashion analogous to ejection seats). Taking the lifeboat inside the crew capsule itself eliminates having to design the lifeboat to withstand launch aerodynamics, pressures, temperatures, and vibrations, which allows for only the act of getting an individual or payload down from orbit.

The present invention describes a series of compact, lightweight, deployable, low ballistic coefficient, dynamically maneuvering reentry vehicles that can be used for on-demand return from Earth orbit of small payloads (e.g., time sensitive results from biological and pharmaceutical manufacturing processes and experiments). In an alternative embodiment, the present invention is scalable to provide on-demand emergency "orbital lifeboat" escape pods for one or several humans that may be operating from an orbiting space vehicle or an orbiting facility and is scalable even further to provide a capability for industrial aerobraking return of commodity materials from interplanetary and cis-lunar space to Earth orbit.

Each variant of the present invention involves the use of an aeroshell that can be either contiguous or dis-contiguous and which forms an approximate shell of revolution when contiguous approximately defined by spherical, paraboloidal, or elliptical shell segments in which the payload resides behind and inside the aeroshell leading edge and specifically in which the center of gravity of the payload lies closer to the aeroshell leading edge than the center of aerodynamic pressure on the aeroshell.

Specific effort has been focused on the ability of each variant of the present invention to actively morph the shape of the aeroshell during reentry at discrete or continuous points along its surface area and/or provide trailing aileron-like control surfaces that also serve to change the effective shape of the aeroshell. In this fashion it is possible to dynamically change the lift/drag (L/D) characteristic of the aeroshell in any arbitrary direction during an otherwise ballistic reentry through the atmosphere. The effect of changing the L/D ratio is to permit the vehicle of the present invention to change its course in any direction by generating aerodynamic lift in any arbitrary direction off the axis of the ballistic velocity vector.

It is an object of the present invention to provide for a compact, lightweight, and stowable—a deployable system small enough in a collapsed state to be carried as standard gear on a spacecraft or commercial off-the-shelf launch and capable of being stored in quantity on orbit at the ISS or at industrial LEO facilities with a standard air lock interface.

It is a further object of the present invention to provide for a fully-automated "one-touch button" reentry from LEO to ground.

It is still a further object of the present invention to provide for shirtsleeve entry.

It is yet another object of the present invention to provide a high level of operations safety in presence of human-tended orbital facilities (no hypergolics or solid motors).

It is yet another object of the present invention to provide a modular, axisymmetric design vehicle comprised of multiple, independent, identical panels enabling economy of scale in manufacturing, operations and maintenance.

It is yet another object of the present invention to provide active L/D control using aft control surfaces common to each panel (for reduced g-loading for human reentry and cross range maneuvering) resulting in a dynamically asymmetric vehicle.

It is yet another object of the present invention to provide onboard firmware control architecture and intelligent behavior allowing for continued vectored L/D control in the presence of failed control surfaces.

The present invention has a very low ballistic coefficient resulting in the reduction of reentry ionization such that constant communication with the vehicle, including the reception of and/or transmission from a ground tracking station to the vehicle of current GPS coordinates of the vehicle is possible and permits real-time adjustment of the vehicle trajectory by the onboard control system (or by commands telemetered to the vehicle by a ground control center) to improve landing accuracy. The combination of the above capabilities enables the present invention to provide on-demand reentry from orbit and to land at any location on Earth with unprecedented accuracy.

BRIEF DESCRIPTION OF THE SEVERAL VIEWS OF THE DRAWINGS

FIG. 22E shows a partial side view of an embodiment of the present invention showing the payload being retracted towards the leading edge of the inside of the aeroshell.

DETAILED DESCRIPTION OF THE INVENTION

Figure 1:
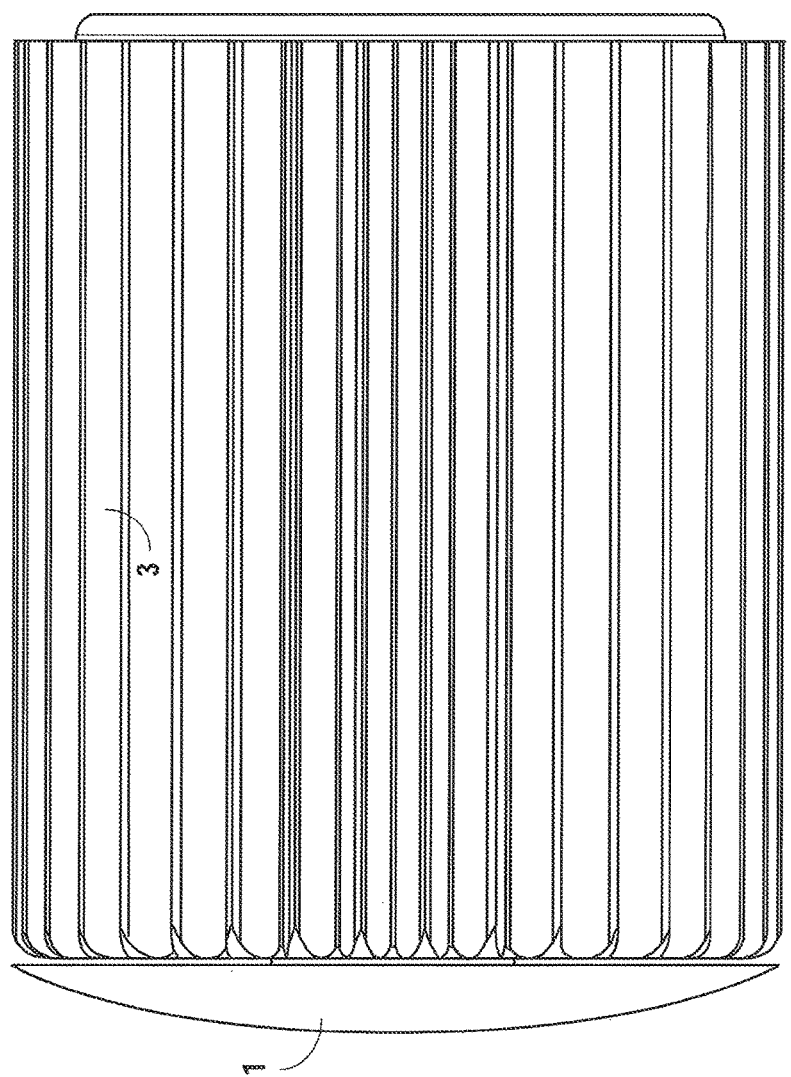
FIG. 1 is a side view of an embodiment of the present invention in a stowed configuration.

FIG. 1 shows a side view of one embodiment of the present invention in the stowed position or configuration. The present invention provides an extremely compact, lightweight, low ballistic coefficient, on-demand reentry system that is transported to orbit or other location where an on-demand or emergency reentry (or aerobraking) capability is needed. As such, the device will make maximum utilization of materials and systems that are able to be compacted into the least possible volume from which, when needed, can be reliably deployed in stages to their fully extended shape (See e.g., FIGS. 3-9 illustrating embodiments of the present invention in ready-for-reentry condition).

Deployment mechanisms include inflatable fabric, stretch fabric, composite materials, and other lightweight structures and mechanisms combined with stored actuating energetics (e.g., spring loaded mechanisms, stored compressed gas, gas generators, electro-mechanical servo actuators, shape memory alloys, magnetic, and electrostatic systems among others).

Still referring to FIG. 1, common to all variants of the invention is a blunt shell of revolution 1. Blunt shell of revolution 1 is fabricated of a traditional rigid thermal protection system material or other suitable high temperature resistant material capable of withstanding the heat loading of reentry. Blunt shell of revolution 1 further importantly establishes the geometry (e.g., spherical, paraboloid, elliptical section) of the leading edge of the vehicle in such a fashion as to maximize the standoff distance of the reentry bow shock at all phases of reentry. Behind this leading edge shield is the stowed ("folded") bulk of the remainder of aeroshell 3 that is extended to form the final geometry of the ready-for-reentry aeroshell and associated vehicle systems.

Figure 2:
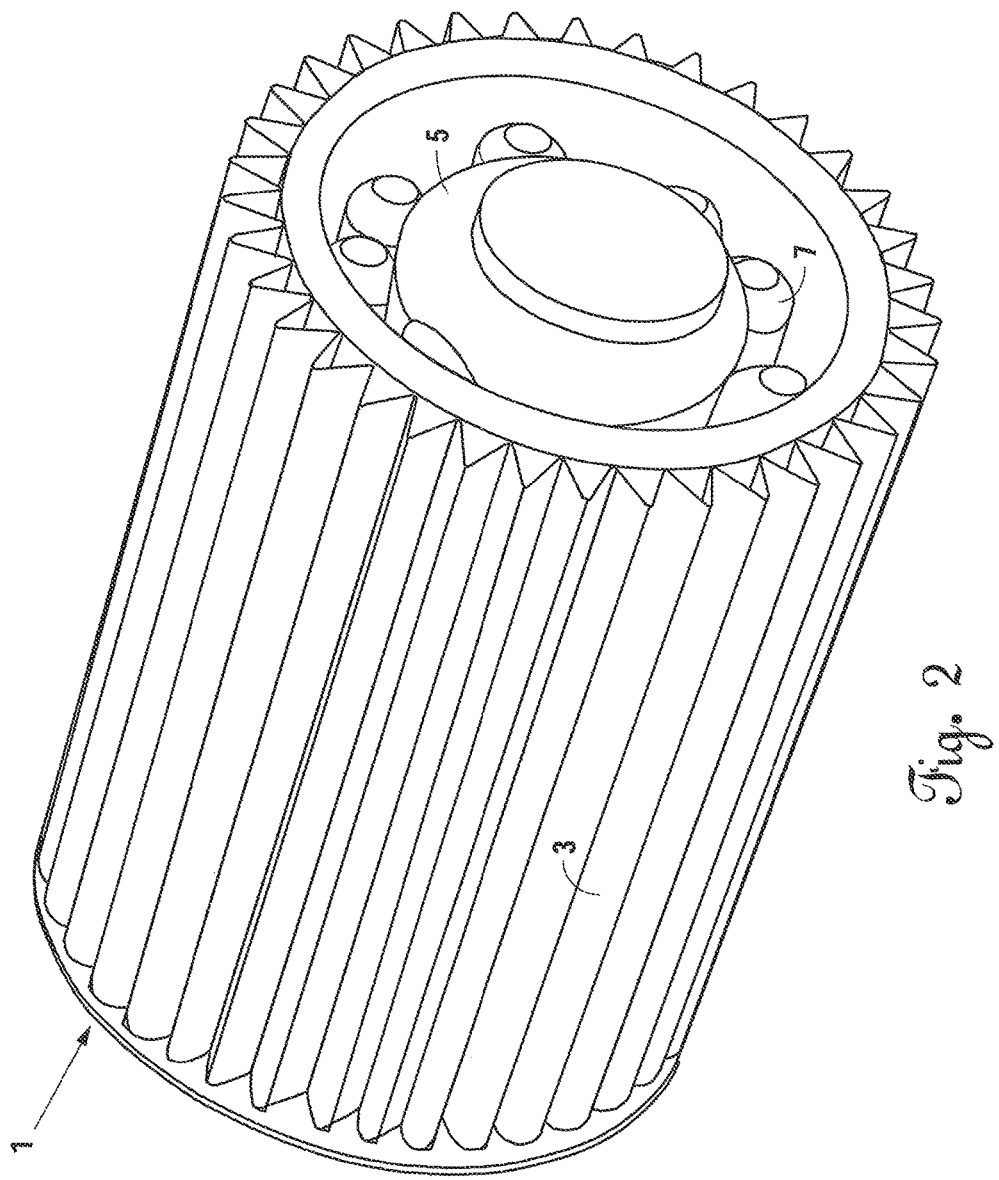
FIG. 2 is an oblique perspective view of an embodiment of the present invention in a stowed configuration.

Referring now to FIG. 2, the aft end of the invention in the stowed position showing the payload capsule 5 is shown. Importantly the vehicle is scalable and comprises a complete system with a mass of 20 kg and an initial volume of less than half a cubic meter (stowed) that expands to an approximately 2 meter diameter aeroshell capable of returning a 1 kg scientific payload from earth orbit to ground. Alternatively, the present invention is scaled up with no changes in basic architectural configuration, to a 2 to 3 cubic meter (stowed) vehicle in the 200 to 300 kg total vehicle mass range capable of returning 2-3 humans from earth orbit to ground on demand.

The central payload core 5 is surrounded by utility and control systems 7 that provide guidance, navigation, and control; attitude and velocity change control thruster arrays; power; actuators; and stored energetics for operating the deployment mechanisms and in-flight aeroshell morphing systems. For larger versions of the present invention, the stowed aeroshell 3 is covered by a very lightweight, multiple layer debris shield (e.g., a Whipple shield) for external storage of the invention (e.g., attached to a docking port on an orbiting space station, ready for immediate shirt-sleeve entry and use) such that the presence of small orbital debris will not compromise the ability of the invention to function in an emergency.

Figure 3:
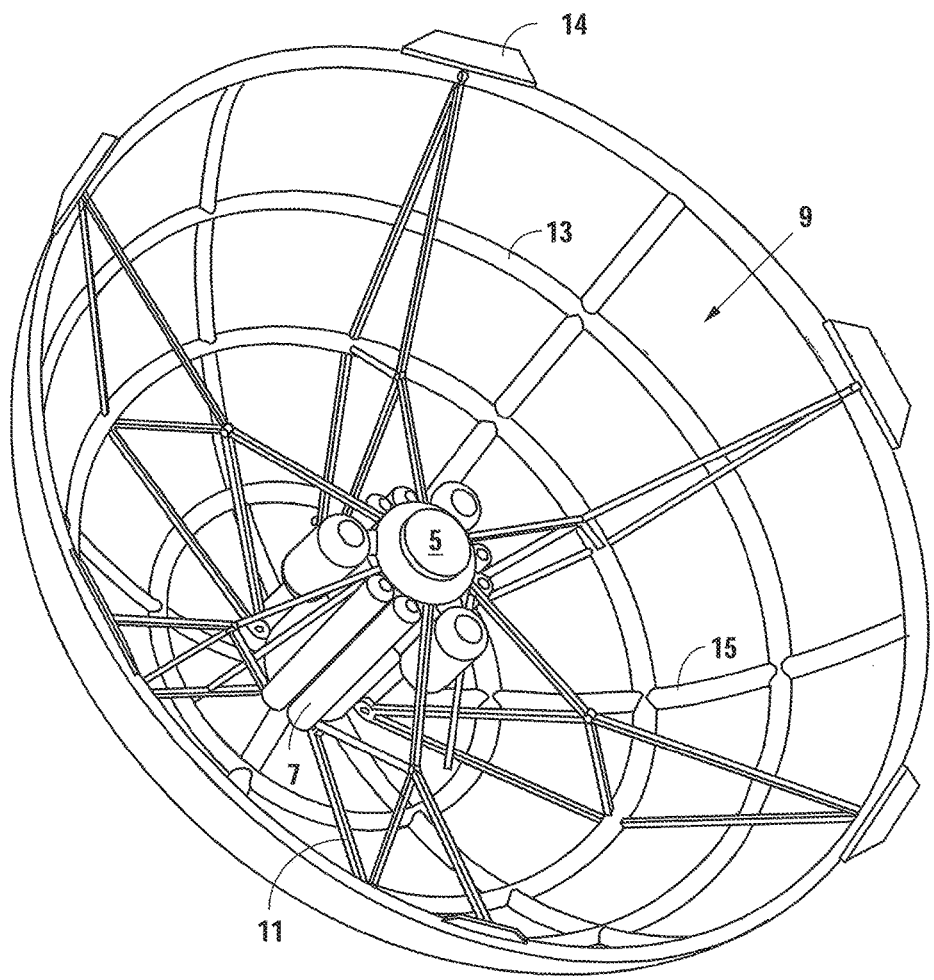
FIG. 3 shows a perspective view an inflation-stiffened embodiment of the present invention with a full axisymmetric aeroshell with independently actuated trailing edge control surfaces.

FIG. 3 shows the reentry configuration for a first variant of the invention in which the aeroshell consists of a refractory or other high temperature fabric 9—which, in one embodiment, could be multi-layer in nature including internal layers capable of containing pressurized gas—deployed and extended by a series of circumferential inflatable stiffeners 13 and radial inflatable stiffeners 15 that serve to rigidize the overall aeroshell 9. The system additionally contains deployable structural mechanisms 11 capable of morphing the shape of aeroshell 9 as well as actuating trailing edge control surfaces 14, as shown in FIG. 3. The central payload core 5 is surrounded by utility and control systems 7 that provide guidance, navigation, and control; attitude and velocity change (including the principal reentry deorbit burn) control thruster arrays; power; actuators; and stored energetics for operating the deployment mechanisms and inflight aeroshell morphing systems.

Figure 4:
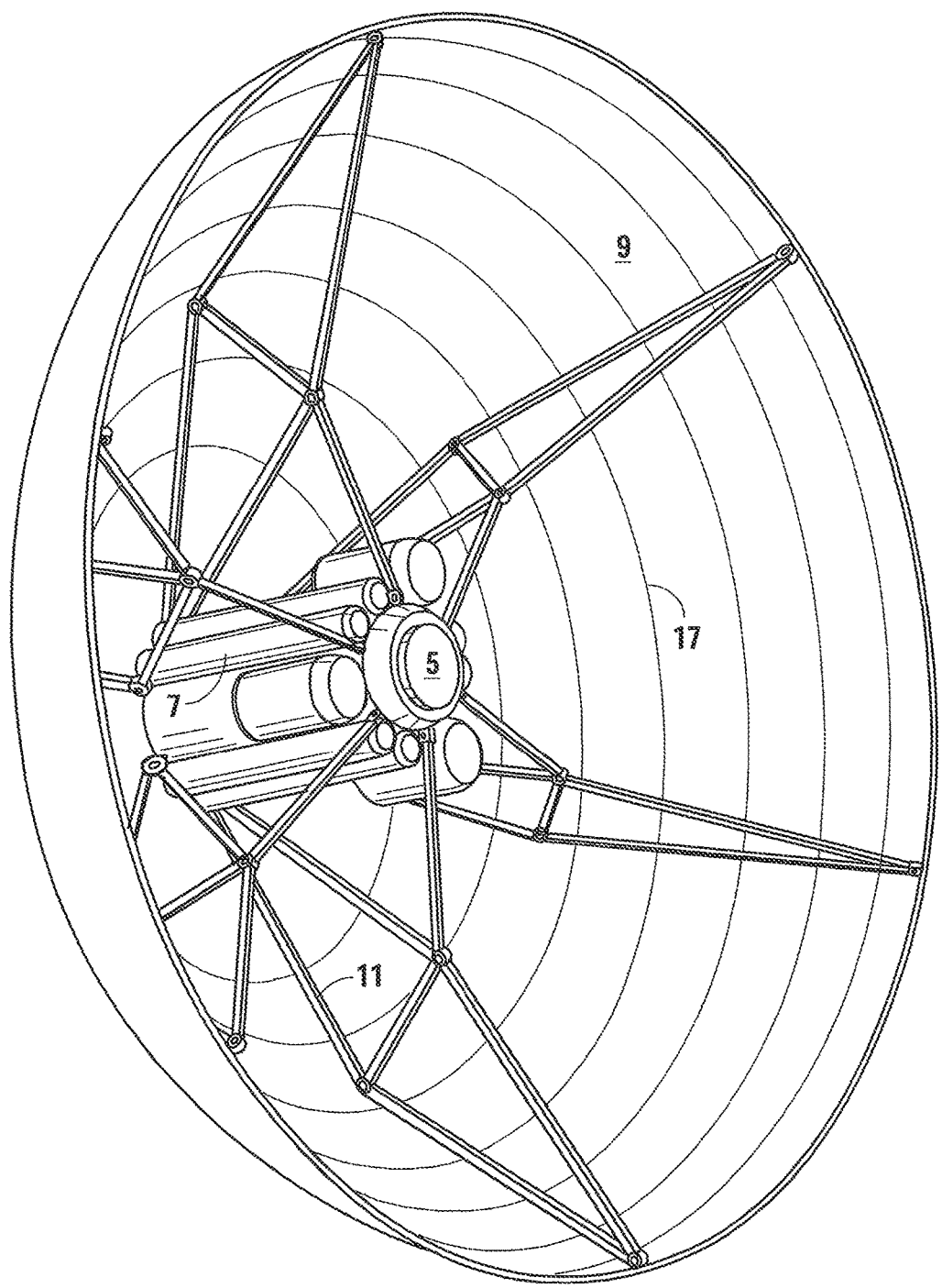
FIG. 4 shows a perspective view of an embodiment of the present invention in a mechanism-deployed configuration of the dynamic aeroshell in which an external skin of refractory fabric is stretched to form a convex shell of revolution.

FIG. 4 shows the reentry configuration for a second variant of the invention in which aeroshell 9 consists of an external refractory or other high temperature fabric 9 (which could be multi-layer in nature including internal layers capable of containing pressurized gas) configured to form a convex shell of revolution and deployed and extended by a series of deployable structural mechanisms 11 capable of morphing the shape of aeroshell 9. Circumferential composite 17 and radial composite (not shown) (e.g., carbon-carbon) elastic stored energy compression members and high strength, high temperature tension fiber stiffeners expand the aeroshell from the stowed configuration to the deployed configuration when activated. Central payload core 5 is surrounded by utility and control systems 7 that provide guidance, navigation, and control; attitude and velocity change (including the principal reentry deorbit burn) control thruster arrays; power; actuators; and stored energetics for operating the deployment mechanisms and inflight aeroshell morphing systems.

Figure 5:
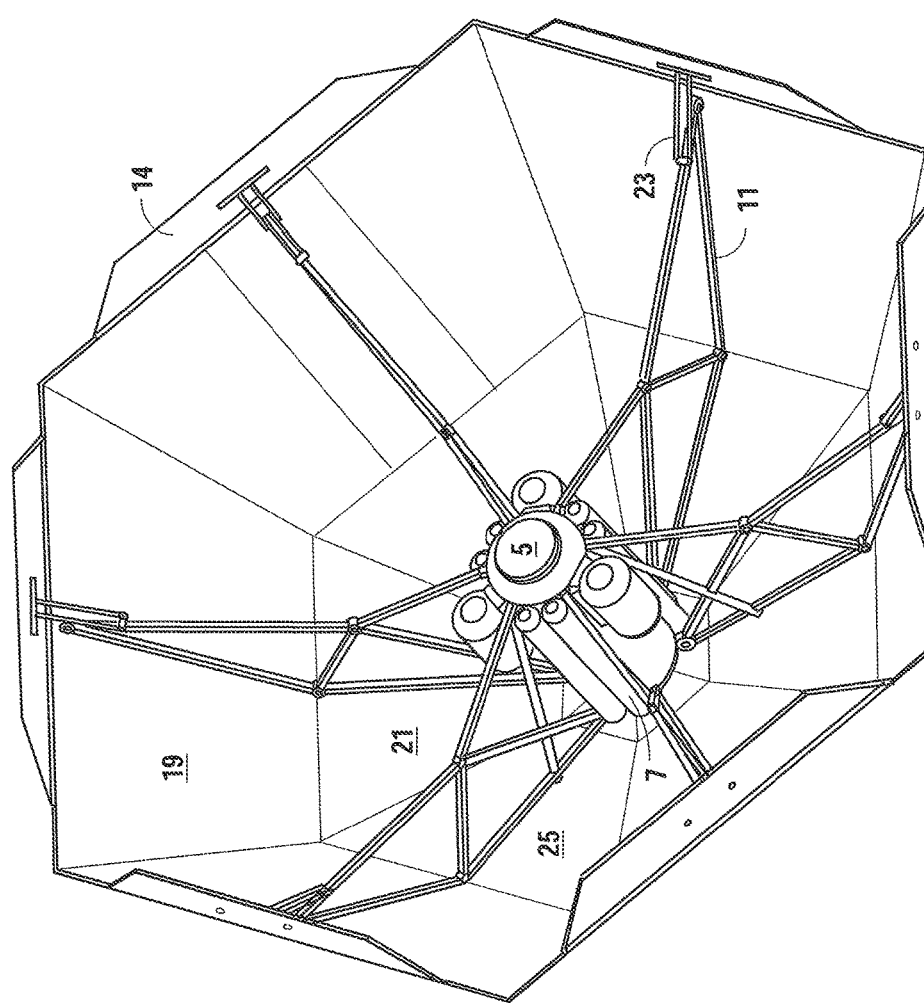
FIG. 5 shows a perspective view of an embodiment of the present invention in which composite rigid segmental geometric panels are positioned using an unfolding deployment mechanism.

FIG. 5 shows the reentry configuration for a third variant of the invention in which aeroshell consists of a plurality of composite (rigid) panel elements 19, 21 deployed and extended from an initially stowed (compacted) configuration by a series of deployable structural mechanisms 11 also capable of morphing the shape of the assembled aeroshell 25. In other words, the relative angles of the panels 19, 21 can be changed during flight and also contain actuated trailing edge control surfaces 14. Series of deployable structural mechanisms 11 morph the shape of aeroshell 25 by controlling the joint angles between rigid panels elements 19, 21, both individually and collectively, for each of a plurality of panel segment petals comprised of elements 11, 19, and 21, as shown in FIG. 5.

The number of segments in a single petal need not be limited to two, as shown FIG. 5. Trailing edge control surfaces 14 are operated by independent actuators 23. Central payload core 5 is surrounded by utility and control systems 7 that provide guidance, navigation, and control; attitude and velocity change (including the principal reentry deorbit burn) control thruster arrays; power; actuators; and stored energetics for operating the deployment mechanisms and inflight aeroshell morphing systems.

Figure 6:
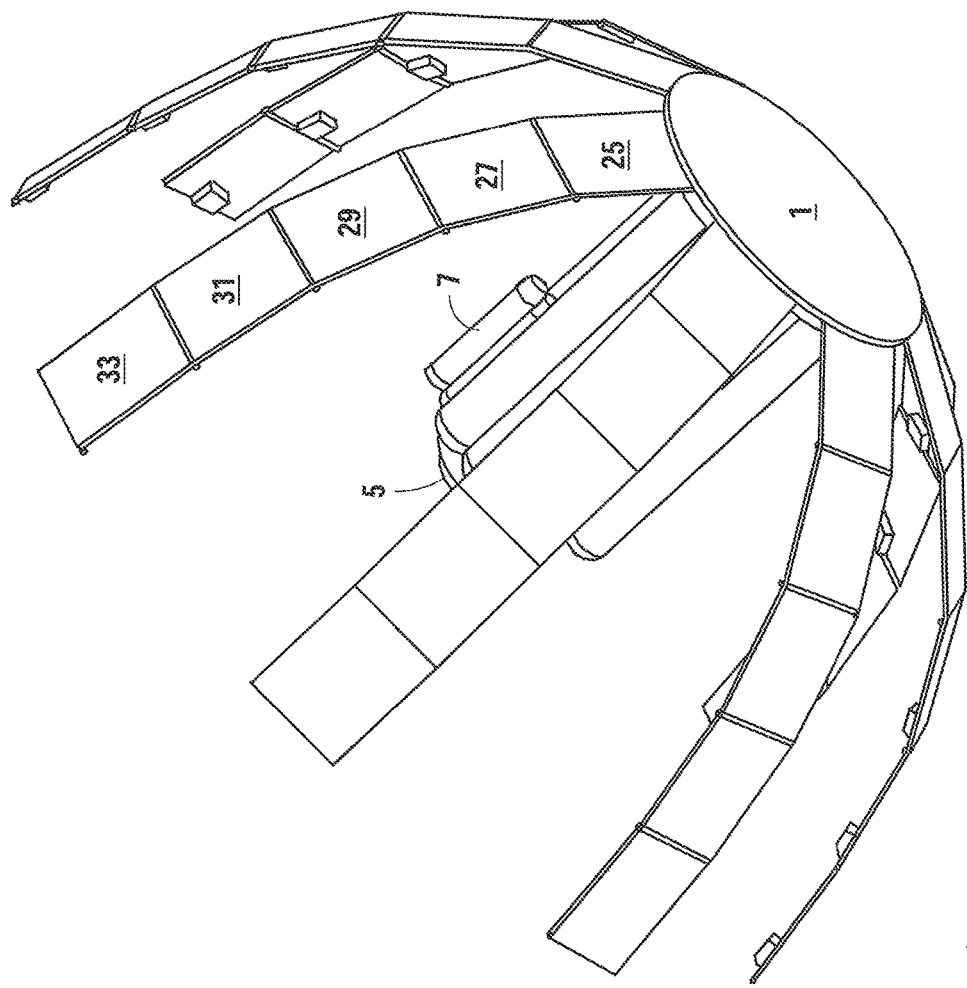
FIG. 6 is an embodiment of the present invention depicting an oblique perspective view upwind (ahead) of the velocity vector for an eight-petal version of the present invention.
Figure 7:
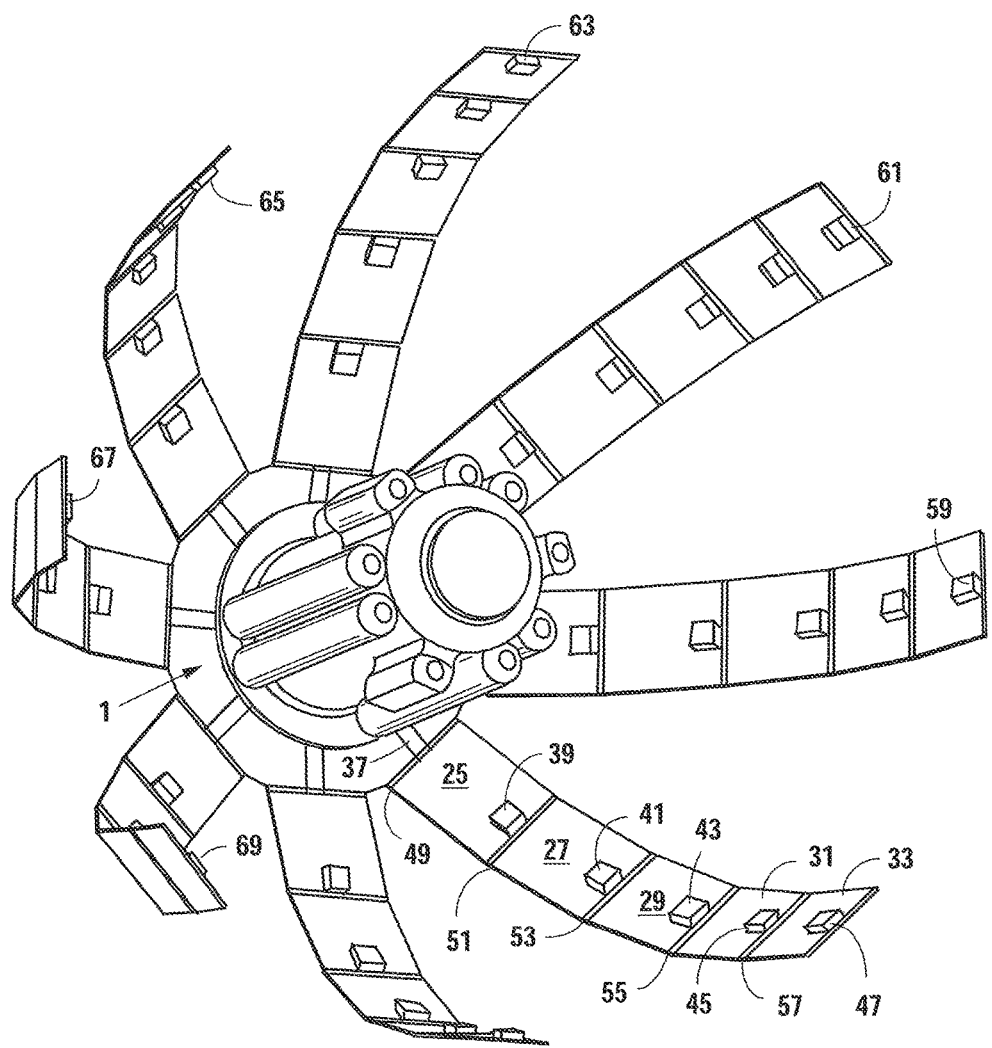
FIG. 7 shows an oblique perspective view downwind of (behind) the velocity vector for an eight-petal version of the present invention.

Referring now to FIGS. 6 and 7, the reentry configuration for a fourth variant of the invention is shown in which the aeroshell is comprised of a plurality of composite (rigid) panel elements 25, 27, 29, 31, 33 deployed and extended from an initially stowed (compacted) configuration by a series of independent actuators 39, 41, 43, 45, 47 (which may be gas or servo-actuated) capable of rotating rigid panel elements 25, 27, 29, 31, 33 about hinge means 49, 51, 53, 55, and 57 and selectively unfolding the desired panel or panels.

Additionally, actuator 47 is capable of independently operating aft control surfaces 14 (not shown) (see FIGS. 3 and 5). Each collection of rigid surface panel means, actuator means, and hinge means form an individual "petal."

The number of panels, actuators, and hinge means in a given petal may be selected to optimize the performance of the vehicle for a given set of reentry constraints and desired maneuverability and assured aerodynamic stability at various phases of reentry (e.g., free molecular flow, transition, hypersonic, sonic, sub-sonic). The number of petals and their arrangement radially about the central axis of the vehicle (as determined by a centroidal axis through payload pod 5 are arbitrary and can be actuated during flight to radially position themselves about that central axis in a series of positions designed to increase or decrease L/D in a particular direction.

Conversely, plurality of petals 8 may be uniformly spaced radially about the vehicle central axis, as shown in FIGS. 6 and 7. The present invention explicitly allows each petal and its associated independent actuators to operate independently of all other petals on the vehicle, to individually actuate (e.g., rotate about each of hinges 49, 51, 53, 55, 57) each of panels 25, 27, 29, 31, and 33 or trailing control surface 14 such that each petal may assume its own independent shape at any time during the reentry. Similarly, all actuators in all petals may be choreographed by a control means such as, for example but not limited to, a distributed series of wirelessly, wired, or optically connected independent processor means associated with each actuator means being directed by a series of guidance, navigation, and control computer control system means such that all petals can act in concert to define a particular angle for all panel sections at a particular hinge level as one proceeds radially outward from the central axis, thus allowing all petals to expand or contract in concert.

It may be, thus, readily understood that through the above described control means, an array of pedals can morph the general shape of the assembled aeroshell 25 by controlling independently and jointly the joint angles between the rigid panels. The number of segments in a single petal need not be limited to 5, as shown in FIGS. 6 and 7. Trailing edge control surfaces 14 (See e.g., FIGS. 3, 5) are operated by independent actuators 47, 59, 61, 63, 65, 67, 69. Central payload core 5 is surrounded by utility and control systems 7 that provide guidance, navigation, and control; attitude and velocity change (including the principal reentry deorbit burn) control thruster arrays; power; actuators; and stored energetics for operating the deployment mechanisms and inflight aeroshell morphing systems.

Figure 8:
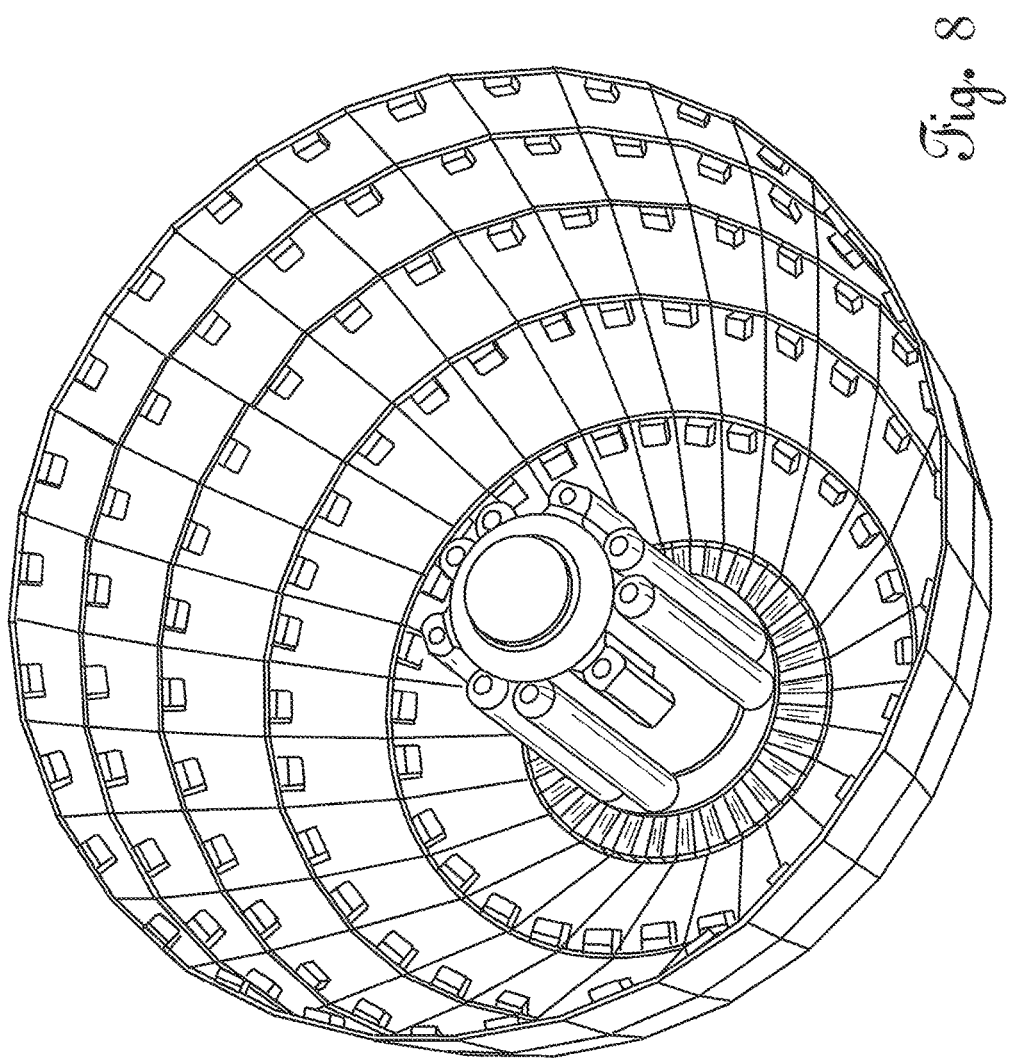
FIG. 8 is an oblique perspective view of an embodiment of the present invention showing downwind of (behind) the velocity vector for a 30-petal version of the present invention in which independent, servo-actuated, rigid drag petal segments are selectively unfolded, in this case for form a full shell of revolution but with each rigid panel segment independently actuated.

FIG. 8 shows a variation of the invention described in FIGS. 6 and 7 in which the number of petals has been increased (arbitrarily to 29 in this case) such that the collection of pedals approximates a continuous shell of revolution whose external shape can now assume any geometric shape (e.g., spherical, paraboloidal, elliptical) when selectively unfolded upon command (e.g., actuation) of all the independent hinge means actuators in each separate petal. The overall device, thus, becomes completely morphable in three dimensions. The morphing capability dynamically changes the shape of the vehicle with respect to the forward velocity vector and creates arbitrary asymmetry that changes the L/D of the overall vehicle to create lift in a desired direction. This lift operates entirely analogously to that of an airplane wing (which can only generate lift in a single direction . . . up) but can do so in any direction. However, the present invention generally does so in a direction essentially perpendicular (for maximum control effectiveness) to the velocity vector of the vehicle at any instant in time during any phase of the reentry trajectory.

It is a second objective of the invention to have each petal structurally connected to a central vehicle backbone that resides aft of leading edge blunt surface 1 (see FIGS. 1 and 6) in such a fashion that each petal may be optional actuated in such a fashion as to be capable of rotating as a unit about the vehicle central axis (as defined by the centerline of the payload pod 5 such that any individual complete petal structure can rotate clockwise or counterclockwise about the central axis on command.

It is a further objective of the invention to have each petal structurally connected to a central vehicle backbone that resides aft of leading edge blunt surface 1 (see FIGS. 1 and 6) in such a fashion that each petal may be optional actuated in such a fashion as to be capable of translating radially as a unit either toward or away (outward from) the vehicle central axis (as defined by the centerline of the payload pod 5 such that any individual complete petal structure can move toward or away from the central axis on command.

It is still a further objective of the invention that the central payload pod 5 may be attached to the central vehicle backbone structure (aft of leading edge surface 1) such that payload pod 5 can moved by actuating means (not shown) that serve to translate the payload pod either toward or away from the leading edge surface 1 in a direction along the vehicle central axis.

It is a further objective of the invention that the central payload pod 5 may be attached to the central vehicle backbone structure (aft of leading edge surface 1) such that payload pod 5 can moved by actuating means (not shown) that serve to translate the payload pod either toward or away from the vehicle central axis.

The purpose of the preceding mechanisms for translating and rotating the petals relative to the vehicle central axis—and in translating the payload pod either fore or aft of the leading edge surface or translating it laterally towards or away from the central axis in any arbitrary direction—serves to permit two important functions of the invention. First, the ability of the payload pod to extend away from the leading edge surface 1 creates space for the deployment (or collapsing) mechanisms to deploy or stow the individual pedals in a more compact form (because they are then not interfering with the payload volume).

Second, the ability of the payload to then move forward, following deployment of the petals, to a position as close as possible to the leading edge surface without violating thermal loading constraints, serves to place the center of gravity of the vehicle as far forward as possible relative to the center of aerodynamic pressure on the deployed aeroshell. This condition then serves to assure aerodynamic stability (resistance to rocking or inversion) throughout the flight regime.

Third, the ability to laterally move the payload pod relative to the vehicle central axis (now defined by the fixed axis of the center of revolution of the leading edge surface of revolution) permits the center of mass of the system to be moved to an eccentric position that induces a rotation of the entire vehicle relative to any axis (arbitrary) perpendicular to the central vehicle axis. This serves as an addition element of control in generating lift that reduces the degree to which the individual petals are required to morph and to provide a means of countering torques imparted to the system by either the trailing edge actuated surfaces or by morphing of the aeroshell shape by actuating petal surfaces (either individually or collectively).

Figure 9:
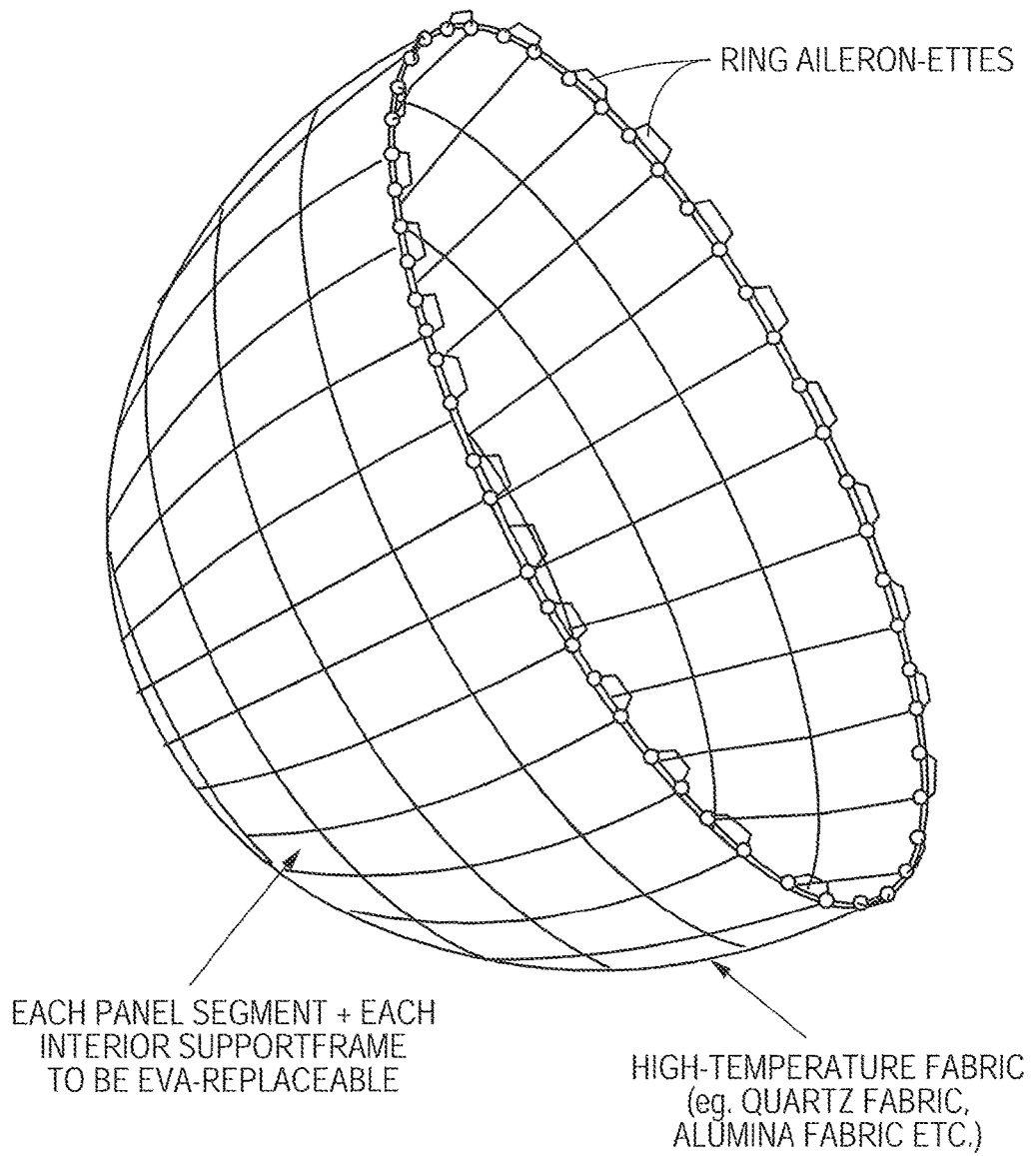
FIG. 9 is a perspective view of an embodiment of the present invention with respect to FIG. 8 in which extensible trailing edge control surfaces are present around the aft ring.

FIG. 9 shows a variation of the vehicle shown in FIG. 8 but includes trailing edge control surfaces 14 (see also FIG. 3) and in a configuration where all petals are drawn inward towards the vehicle central axis creating a shuttle-cock type geometry. A crucial element of the invention is that the vehicle can dynamically assume any geometric shape, including varying shapes defined by shells of revolution as well as asymmetric shapes, throughout the reentry profile. This capability enables the invention to dynamically correct its position throughout reentry and, thus, dramatically reduce the landing footprint (i.e., targeting error) to such a degree that packages could routinely be delivered from orbiting industrial facilities to a company receiving station on the ground, thus, delivering time sensitive payloads (e.g., biological samples) and, similarly, the ability to precision-deliver an injured human safely from orbit to a specified medical facility.

Figure 10:
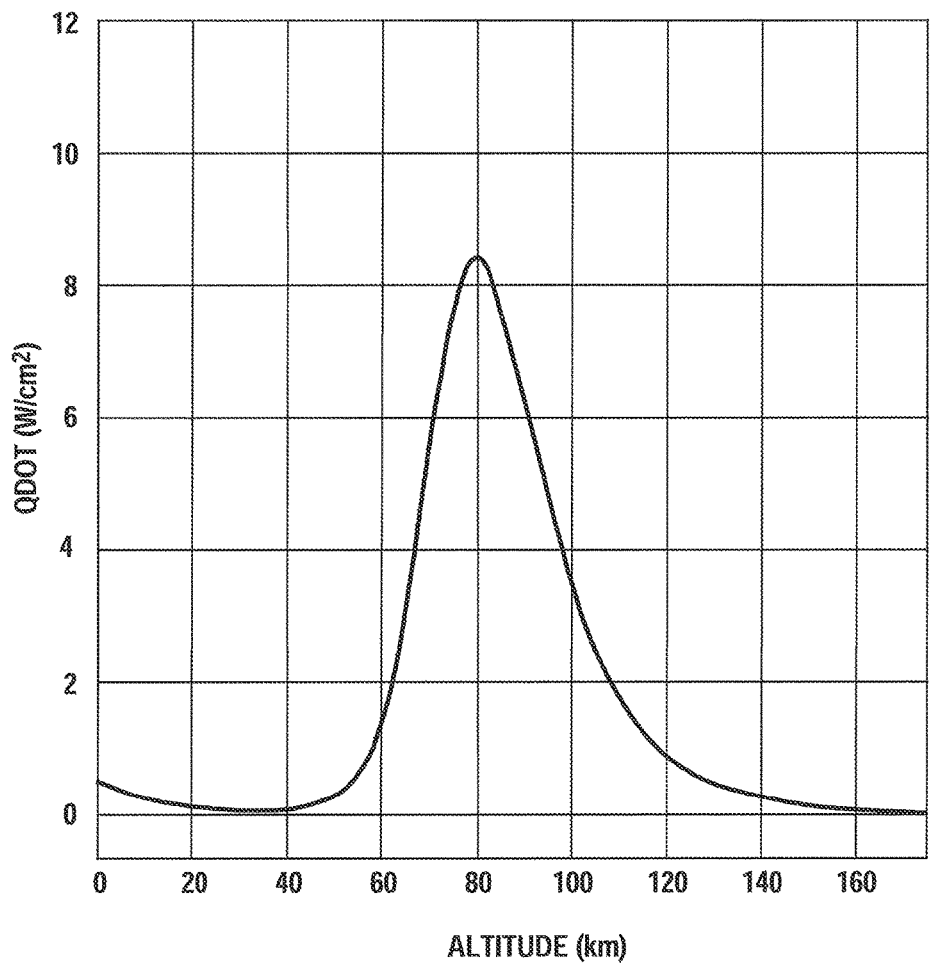
FIG. 10 shows a plot of the heat flux rates (in $W/cm^2$) versus altitude during reentry from Earth orbit for a deployable version of the present invention with a complete system mass of 20 kg and a ballistic coefficient of 10.
Figure 11:
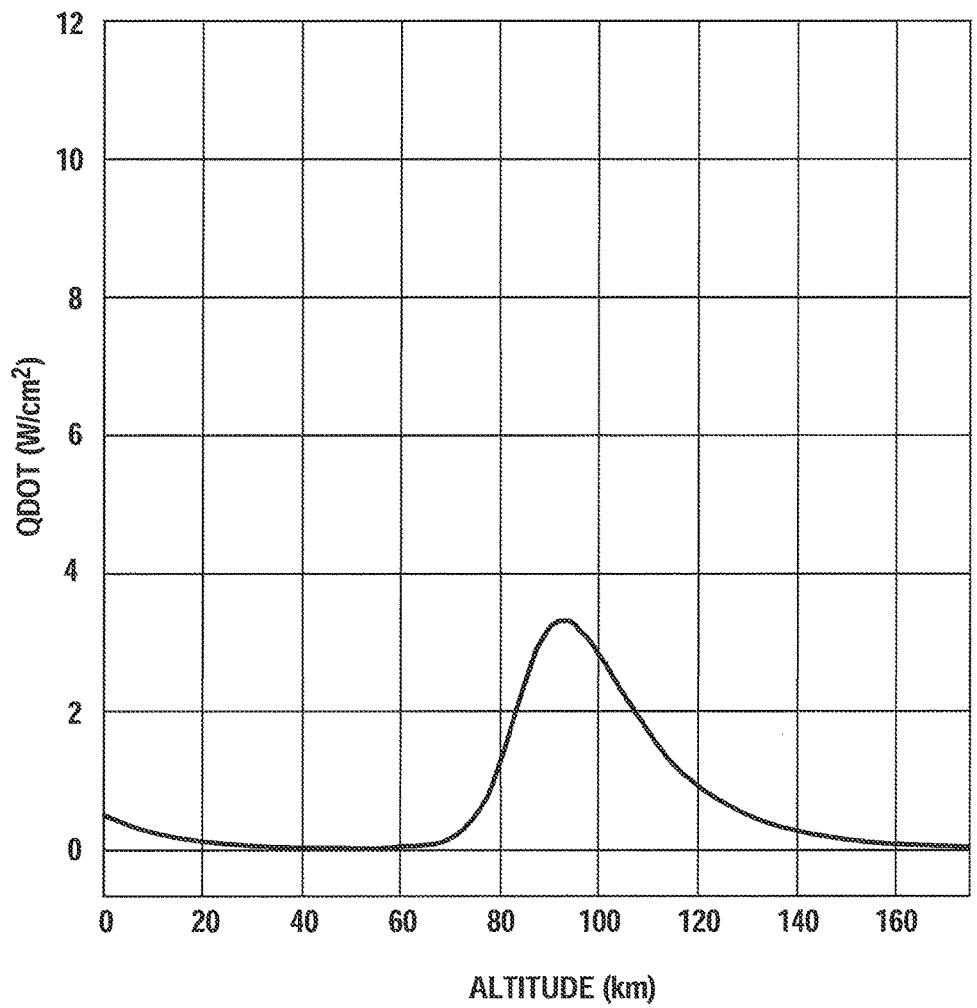
FIG. 11 shows a plot of the heat flux rates (in $W/cm^2$) versus altitude during reentry from Earth orbit for a deployable version of the present invention with a complete system mass of 20 kg and a ballistic coefficient of 1.

The inventor has conducted substantial analyses of the present invention under a large number of entry descent and landing (EDL) scenarios using STK/Astrogator, a high precision numerical integration program with several atmospheric models and precise force models. Most analyses focused on low $C_B$ vehicles for the reasons explained above. The descent and landing trajectories and time histories from STK were used in conjunction with the Chapman heating equation to estimate peak stagnation point heating rates (W/cm2). FIGS. 10 and 11 illustrate heating load trend with respect to $C_B$.

While moving towards a very low $C_B$ seems ostensibly obvious, there is a competing trend in that the stowed volume for the aeroshell grows as $C_B$ decreases. In the preferred embodiment, the practical design space for stowable, on-demand reentry systems lies between the $C_B$ limits of 1 and 20 with a likely optimum between 5 and 10.

Still referring to FIGS. 10 and 11, the results in these plots present heat flux (W/cm$^2$) on the leading edge of a 20 kg deployable aeroshell as a function of altitude following a 1.5 kg retro burn (in actuality a venting of cold propellant gas through the RCS system from an onboard carbon composite pressure vessel) from ISS orbit. By way of comparison, the peak total heat flux experienced by the Mars Pathfinder aeroshell was 106 W/cm², and the Apollo command module, re-entering at 10.77 km/s (atmosphere-relative speed at 121.9 km altitude) experienced a peak total heat flux of 497 W/cm².

The plots of FIGS. 10 and 11 show that the lower $C_B$ vehicles experience peak thermal loading at significantly higher altitude and that the peak loading is significantly reduced for the lower $C_B$ values. The peak thermal heat flux for the lowest $C_B$ vehicle is 30 kW/cm² of vehicle surface, an extremely low number for a reentry scenario. This only applies to the area near the leading edge stagnation zone; thermal loading decreases towards the trailing edges of the aeroshell.

Figure 12:
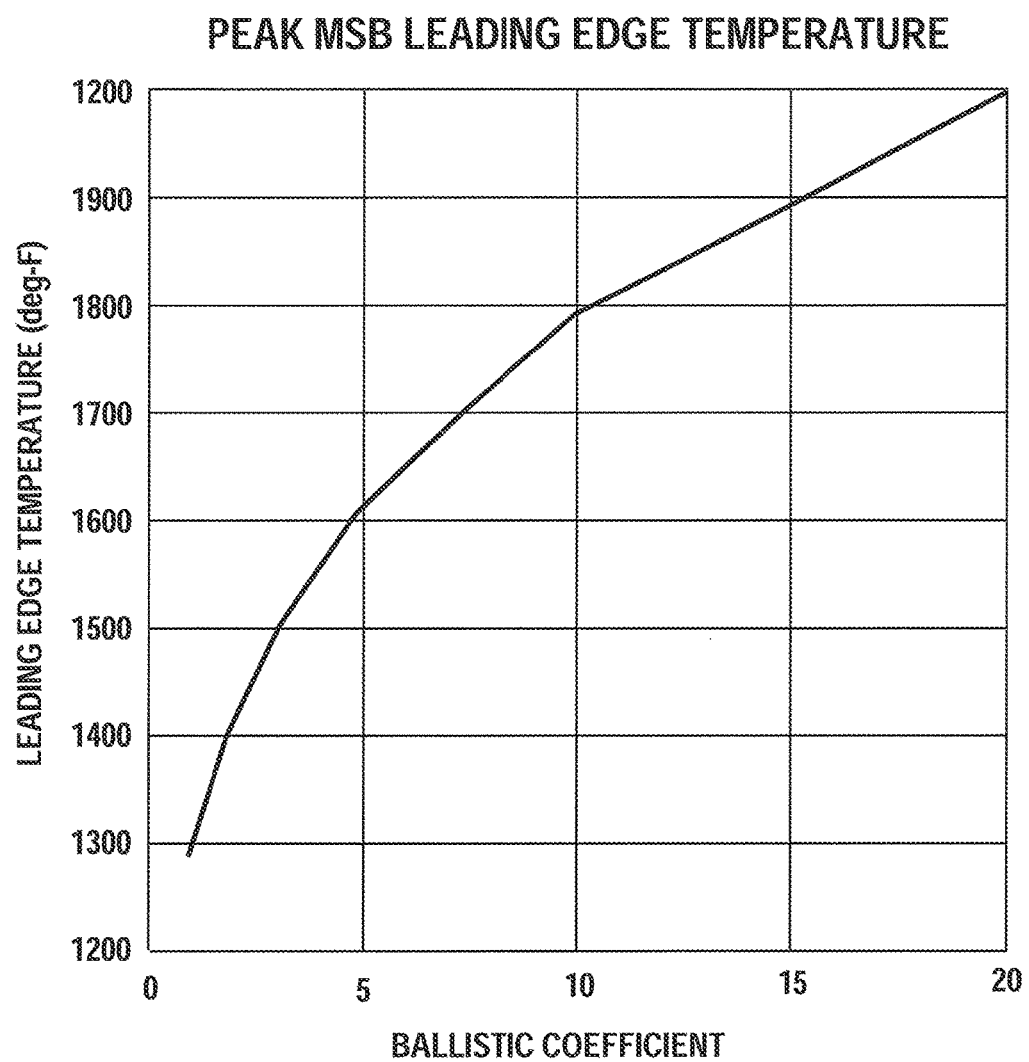
FIG. 12 shows a plot of the peak leading edge temperature for a deployable 20 kg version of the present invention versus varying ballistic coefficient.

Referring now to FIG. 12, a plot of the corresponding peak leading edge temperature versus a varying ballistic coefficient for a deployable 20 kg version of the present invention MSB vehicle for $1 \leq C_B \leq 20$ is shown. Importantly, for $C_B < 10$, peak temperatures do not exceed the working limits of certain refractory fabrics (e.g., Nextel®). This dramatically expands the TPS design space for the vehicle. Given these reduced peak temperatures and the inherent initially axisymmetric design for the on-demand reentry system of the present invention, reusable, easily maintainable vehicles can be developed along the lines of the present invention beginning with 1 kg return payloads and scaling up to emergency human reentry masses.

Figure 13:
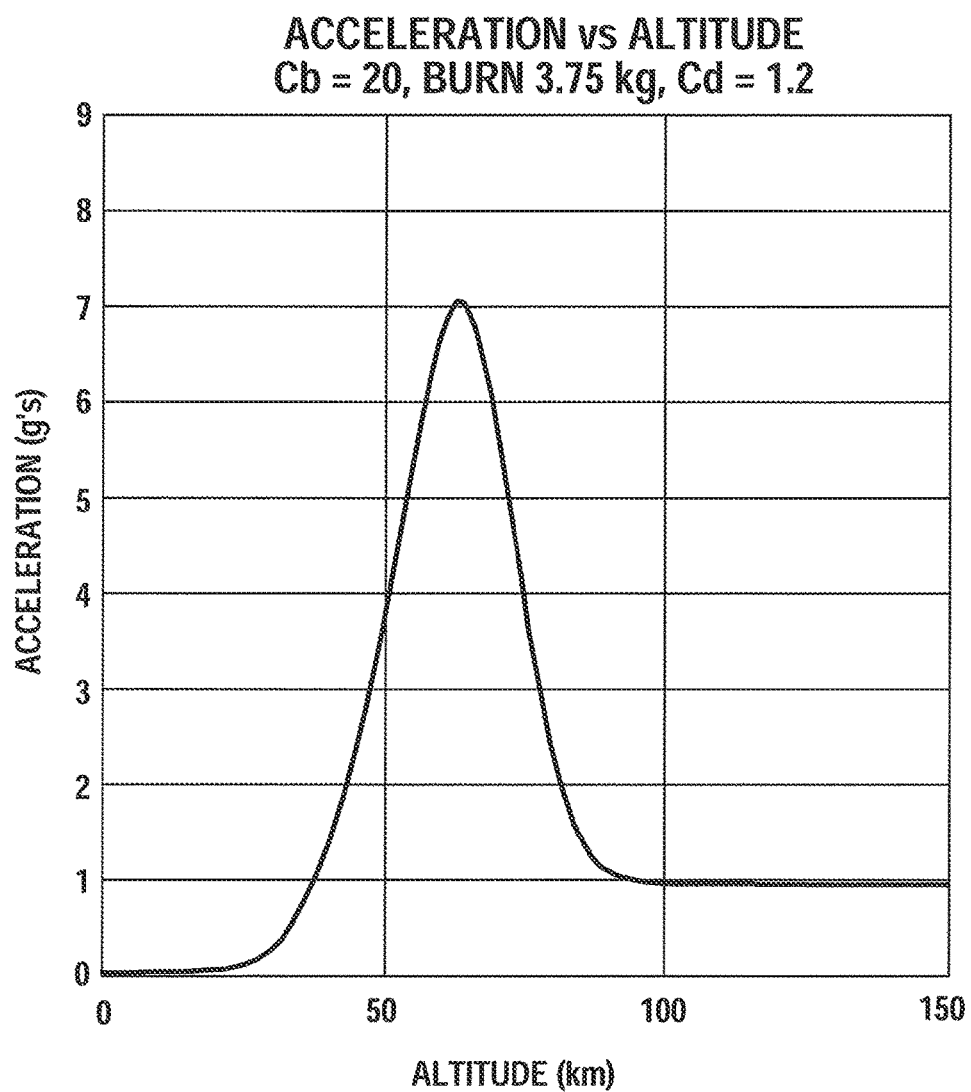
FIG. 13 shows a deceleration profile as a function of altitude (during descent from orbit) for a 50 kg version of the present invention following a 3.75 kg propellant burn from ISS orbit with a ballistic coefficient of 20.
Figure 14:
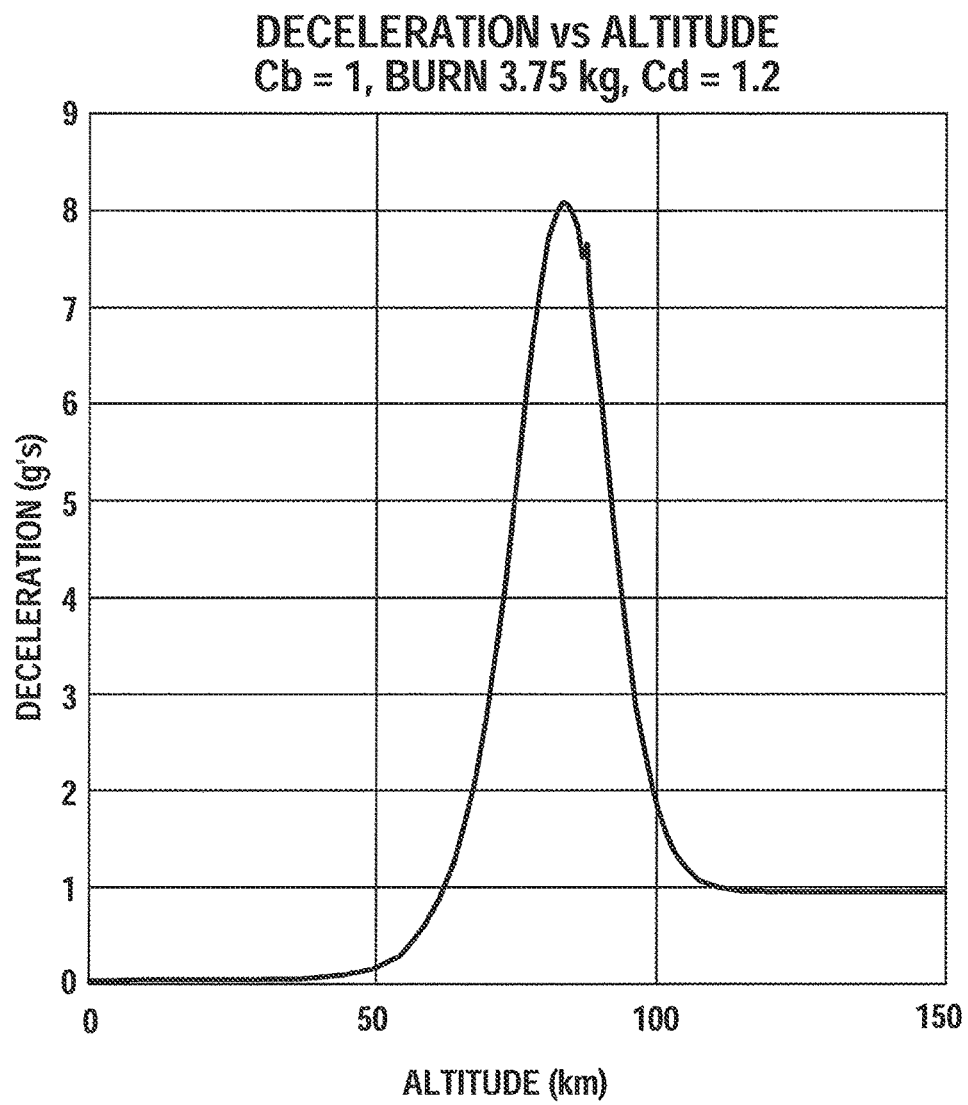
FIG. 14 shows a deceleration profile as a function of altitude (during descent from orbit) for a 50 kg version of the present invention following a 3.75 kg propellant burn from ISS orbit for with a ballistic coefficient of 1.

Referring now to FIGS. 13 and 14, typical variance of deceleration g-loading vs. altitude for a similar ballistic coefficient variance are shown. A deceleration profile as a function of altitude (during descent from orbit) for a 50 kg version of the present invention following a 3.75 kg propellant burn from ISS orbit with a ballistic coefficient of 20 is shown in FIG. 13. A deceleration profile as a function of altitude (during descent from orbit) for a 50 kg version of the present invention following a 3.75 kg propellant burn from ISS orbit for with a ballistic coefficient of 1 is shown in FIG. 14.

For the lower ballistic coefficient vehicle ($C_B=1$), peak decelerations of approximately 8.1 g's occur at 82 km, as shown in FIG. 14. At $C_B=20$, the peak deceleration of 7 g's occurs at 62.8 km, as illustrated in FIG. 13. The trend is that lower $C_B$ vehicles will brake higher in the (thinner) atmosphere due to increased frontal drag area and will experience slightly higher g-loading. The g-loadings shown here (FIGS. 13 and 14) do not pose any problems with scientific or industrial downmass from the ISS. However, the g-loadings may pose undesirably high levels for comfortable human reentry.

The maximum deceleration is independent of physical characteristics of the vehicle (mass, size, drag coefficient) and is dependent only on the entry speed and the flight path angle. The flight path angle can be reduced by introducing lift through the use of trailing actuator surfaces and active vehicle geometry morphing which are at the heart of the invention. As an example, the L/D effect (on peak deceleration) of adding even a small amount of lift to the vehicle through the use of aft-body control surfaces are readily apparent, as illustrated below in Table 1 showing the peak g-loading for several variations of ballistic coefficient as a function of L/D ratio for a lifting aeroshell version of the present invention:

TABLE 1

| Lift/Drag Ratio | Peak g's $C_B = 1$ | Peak g's $C_B = 20$ |
|---|---|---|
| 0 | 8.1 | 7 |
| 0.1 | 4.5 | 3.9 |
| 0.2 | 2.7 | 1.3 |

The present invention optimally trims the vehicle throughout the reentry trajectory to achieve human-comfortable g-loading and to obtain a significant amount of cross range maneuvering for landing zone targeting.

Figure 15:
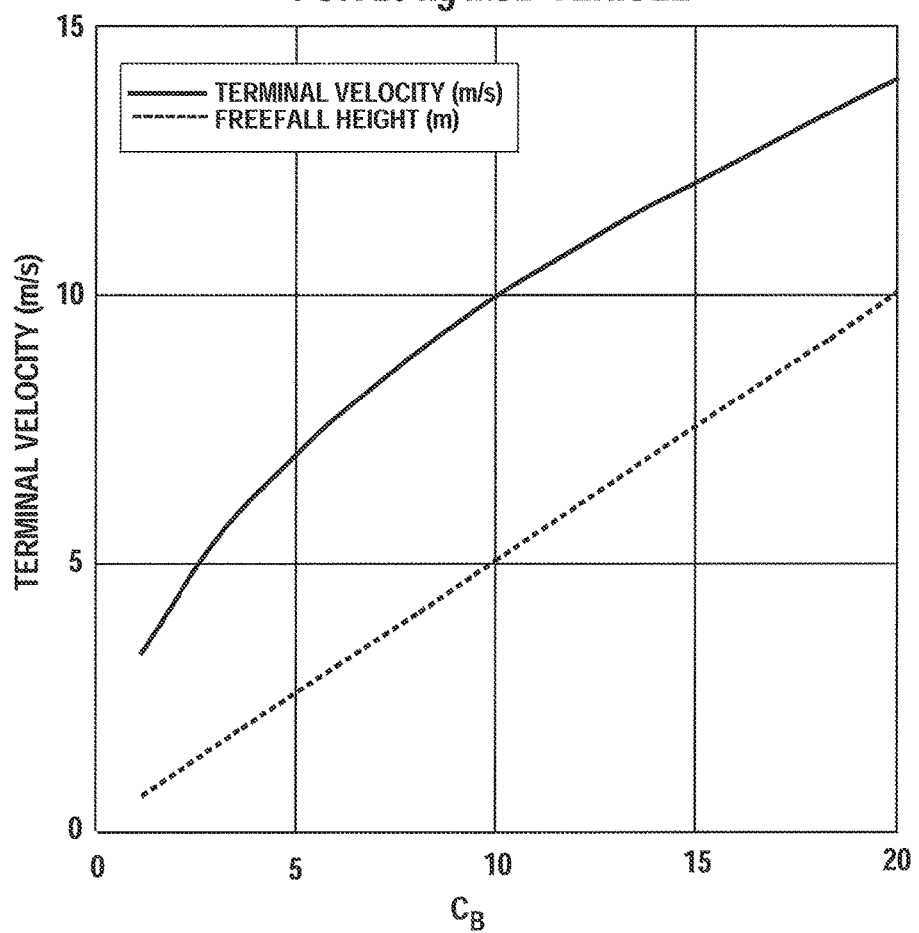
FIG. 15 shows a plot of the landing velocity for a 20 kg version of the present invention for varying ballistic coefficients ($C_B$).

Referring now to FIG. 15, the landing velocity for a 20 kg version of the present invention for varying ballistic coefficients ($C_B$) is provided. More particularly, the landing velocity and the associated equivalent direct drop height for a range of MSB vehicles with $C_B=1$ to 20 is illustrated. For the 20 kg MSB, a $C_B$ of 20 equates to a 1 m diameter deployed vehicle. A $C_B$ of 1 equates to a roughly 4.7 m diameter deployed vehicle. With $C_B=1$ for this vehicle, the landing velocity is equivalent to jumping off a 0.7 m high step. For a $C_B$ of 5, the drop is equivalent to that of a tall individual. The inescapable conclusion of this is that within this design space, landing parachutes are unnecessary.

Figure 16:
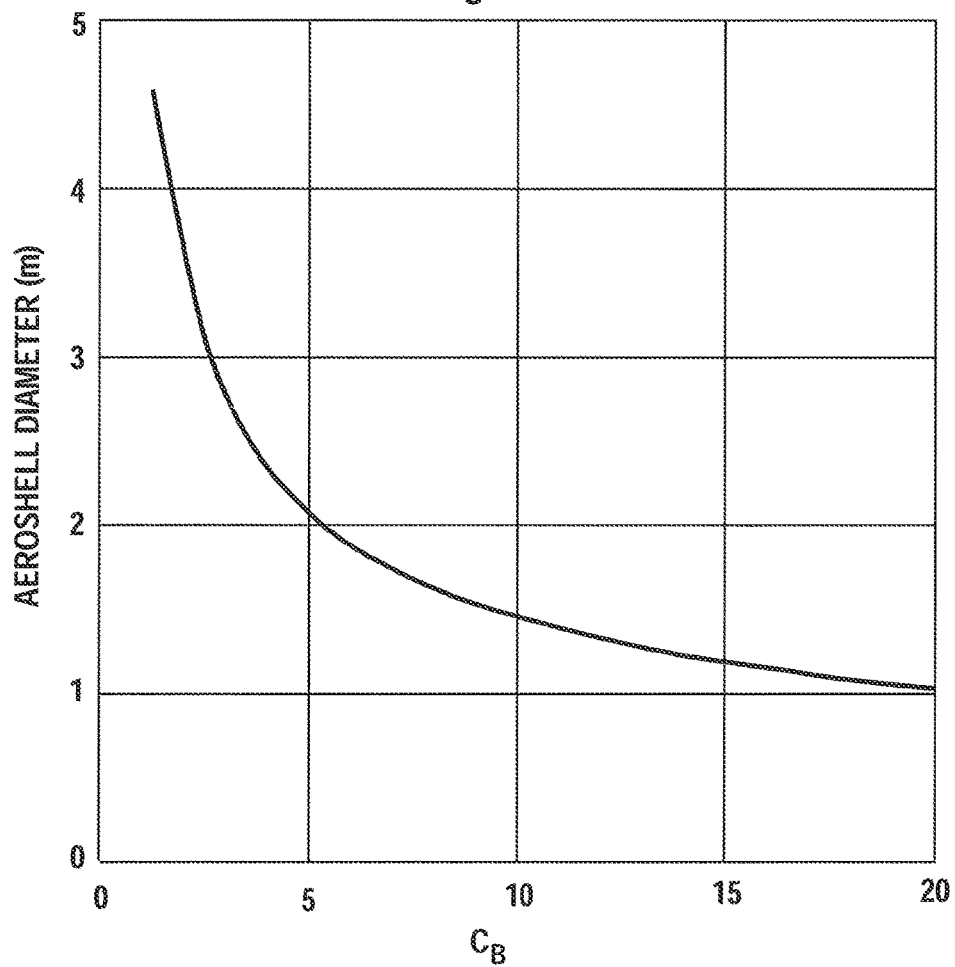
FIG. 16 shows a plot of the deployed diameter for a 20 kg version of the present invention for varying ballistic coefficients ($C_B$).
Figure 17:
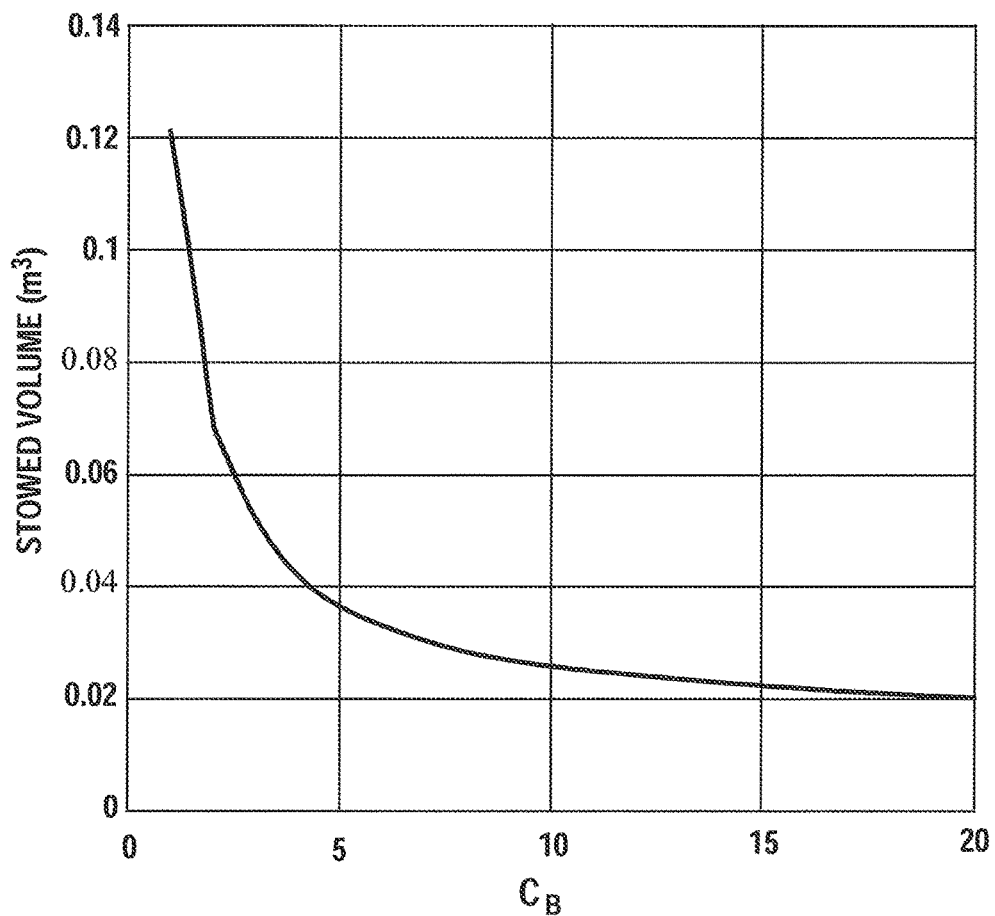
FIG. 17 shows a plot of the stowed aeroshell volume (complete structure, with shield, guidance package, and attitude control thrusters and gas supplies) for a 20 kg version of the invention as a function of ballistic coefficient ($C_B$).

FIGS. 16 and 17 show the general mechanical performance range for variations of the invention used for the return of a 1 kg payload from ISS. The present invention uses a $C_B=5$ vehicle as a starting point for optimization for recovery of a 1 kg science payload from ISS. This leads to a stowed vehicle volume of about 40 liters and a deployed aeroshell diameter of about 2 meters. Overall vehicle mass, including aeroshell, actuators, RCS, GNC/comm avionics, payload and propellant (dry nitrogen) will be about 20 kg.

The above background, along with test results from non-maneuvering low $C_B$ vehicles described earlier, validates that reentry thermal loading can be reduced to where novel non-ablative TPS solutions are possible for the aeroshell. Zylon® 2000 and Nextel® 312 appear are viable candidates for flexible (inflatable or mechanically deployed) low $C_B$ vehicles. Carbon-carbon forms the opposite end of the material spectrum and is used selectively in the invention, as described below in detail.

Figure 18:
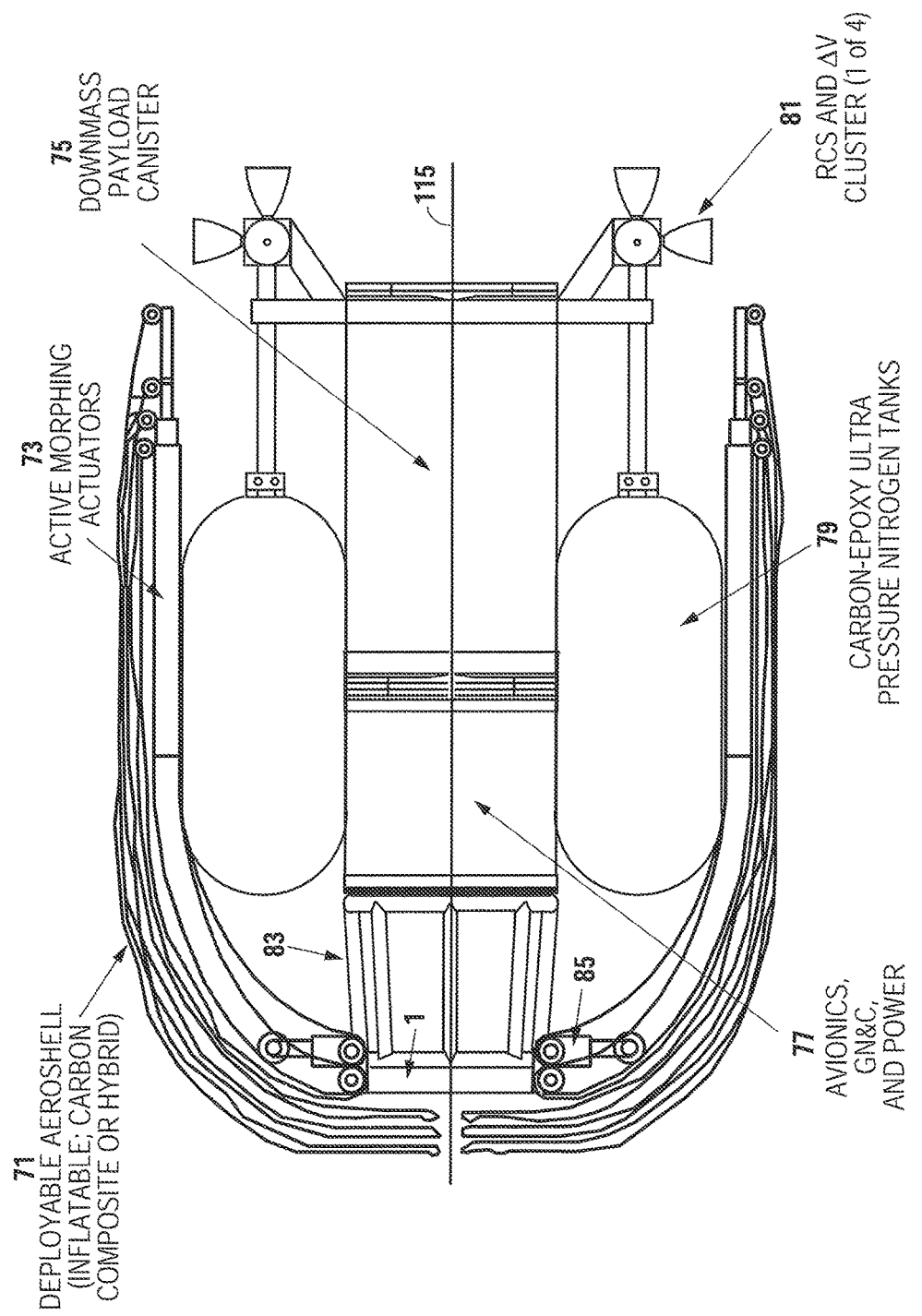
FIG. 18 is a side view of an embodiment of the present invention in a compacted or stowed configuration following removal from its launch packing tube.

With reference now to FIG. 18, a downmass payload canister is partially enclosed by a deployable aeroshell in a stowed configuration. The stowed size is approximately 30 to 40 liters with a mass of 20 kg including aeroshell, actuators, RCS, GNC/comm avionics, payload and propellant (dry nitrogen). However, the present invention is scalable to larger payloads. The present invention is also capable of precision landing 1 kg of downmass from ISS.

FIG. 18 shows a longitudinal cross section of one instance of the invention in the stowed configuration with the deployable aeroshell elements 71 compacted around a central core consisting of a payload container 75, energetics storage 79, and avionics, guidance, navigation, control (GNC), and power systems 77 which are optionally mounted on 3D translation stage 83. GNC systems also make use of navigational sensors (e.g. GPS, star trackers, and inertial sensors) and have an integral communications system 91 (see FIG. 20) that allows the vehicle to remain in contact with both an orbiting facility and a ground control facility throughout the entirety of the reentry. The use of an extremely low ballistic coefficient (between 1 to 20) as is inherent in the invention described here minimizes or eliminates the radio communications blackouts that are common on high energy (high ballistic coefficient) reentry vehicles that have been characteristic of the vast majority of government-developed space vehicles. Translation stage 83 is capable of extending the above core package either longitudinally (parallel to) or along any perpendicular axis to the nominal vehicle central axis (which previously was defined as the axis of rotation of leading edge shield 1 in FIG. 1 but for convenience of reference we define it explicitly here as axis 115 which in the stowed, non-maneuvering configuration will represent both the centroidal axis of both the leading edge shield (a shell of rotation) and the longitudinal centroidal axis of the payload canister 75. In translating parallel to axis 115 the vehicle core 75, 77, 79, 81 will move either towards or away from the leading edge shield 1 or away from it. Moving towards leading edge shield 1 moves the vehicle center of gravity 93 in the direction of velocity vector 119, moving it further from the aeroshell center of aerodynamic pressure 89, thus providing for inherently stable forward flight. It will be a primary objective of the invention design to ensure that the vehicle center of mass 93 remains forward along the velocity vector of the center of aerodynamic pressure 89 at all points along the reentry flight trajectory. The guidance, navigation, and control system 79 will furthermore utilize translation stages 83 to further enhance the stability of the vehicle and to enhance L/D ratio in a desired direction by translating the vehicle core elements in such a fashion as to permit the entire vehicle in the deployed state to rotate relative to any axis perpendicular to the velocity vector 119. Continuing with FIG. 29, vehicle includes a series of reaction control system (RCS) jets 81 that may also be used in an extended use ("burn") state so as to effect the reentry deorbit propulsive maneuver ("deorbit burn") as well as to serve as attitude control thrusters for control of the vehicle orientation in orbit, and while descending through the segments of the upper atmosphere where the aerodynamic maneuvering elements of the invention are ineffective. The RCS system will contain sufficient propellant (e.g. high pressure cold gas nitrogen and/or traditional satellite control bipropellants such as MMH and NTO) to allow for maneuvering of the vehicle away from an orbiting facility (or damaged flight vehicle in the case of a lifeboat version for humans), aligning the vehicle for a desired deorbit burn, and thence serving to stabilize the vehicle during deployment and active use of the maneuvering aerobrake aeroshell. After encountering sensible atmosphere (where aerodynamic maneuvering can take place) the RCS system will continue to provide limited correcting attitude correcting torques until exhaustion of the fuel.

Figure 19:
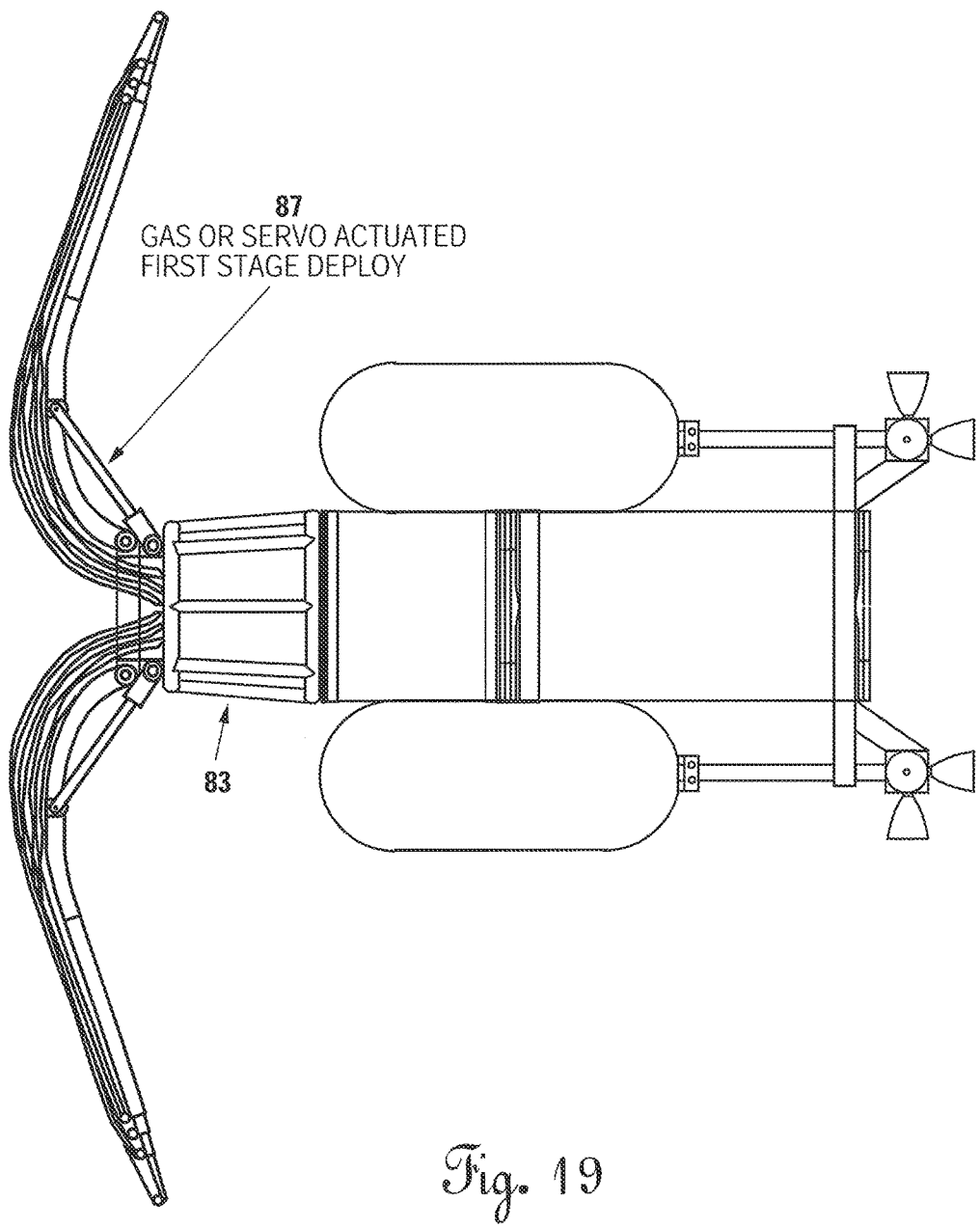
FIG. 19 is a side view of an embodiment of the present invention depicting the first stage of aerobrake deployment with respect to FIG. 4.
Figure 20:
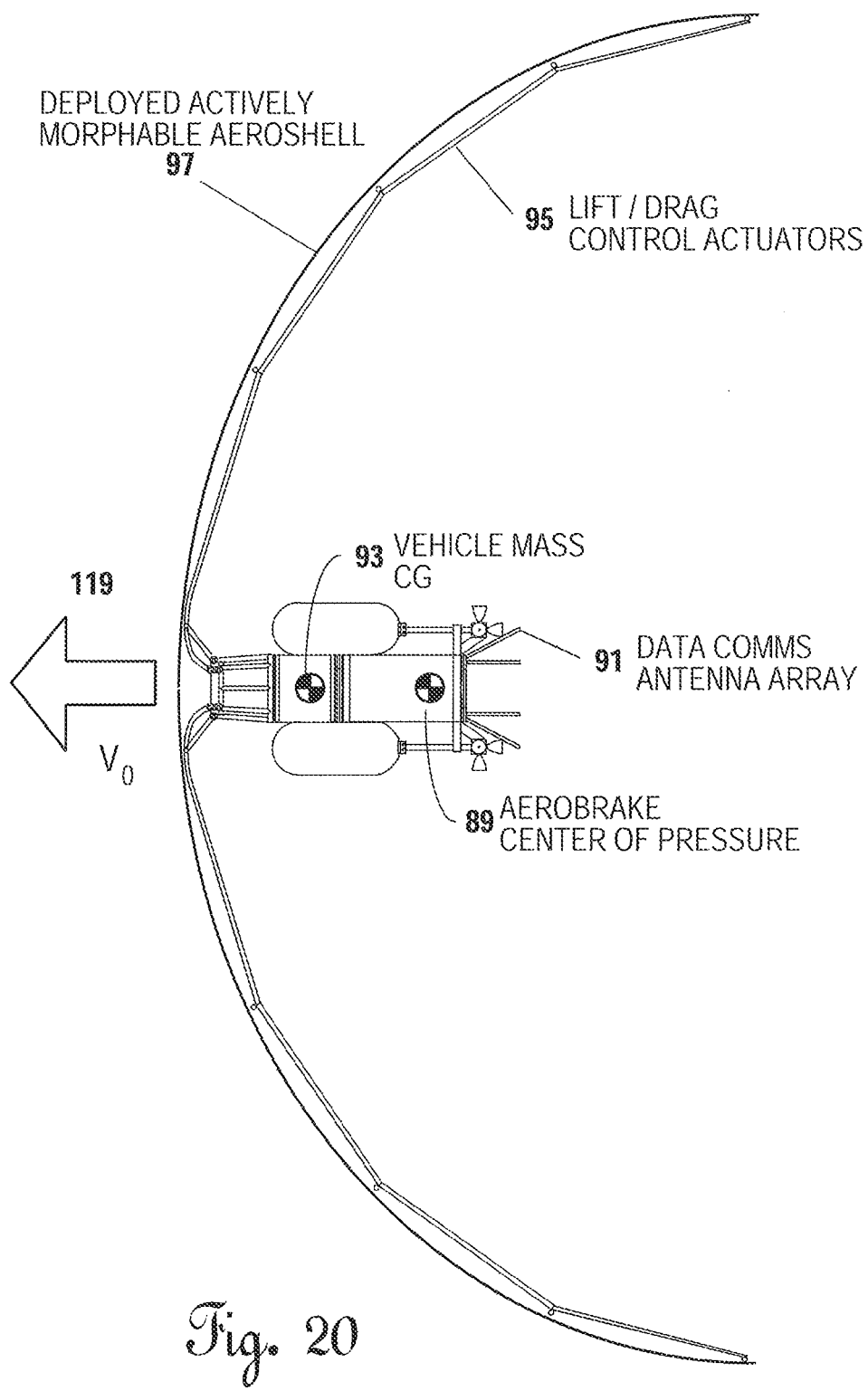
FIG. 20 is a side view of an embodiment of the present invention in a fully deployed configuration with respect to FIG. 4.

Referring now to FIG. 19, the first stage of aerobrake deployment with respect to FIG. 4 is provided. The deployment may be actuated via gas or servo actuation, as shown in FIG. 19. FIG. 20 shows an embodiment of the present invention in a fully deployed configuration with respect to FIG. 4 following retro burn and alignment for reentry. The overall vehicle mass centroid is inside the aerobrake center of pressure, making the device conditionally stable for all phases of reentry.

FIG. 19 shows the vehicle of FIG. 18 in the first stage of deployment through actuator means 87. Vehicle core translation stage 83 is shown in its stowed configuration. Depending on the aeroshell design (see FIGS. 1-9) a first step in the deployment sequence may be to extend the vehicle core systems away from the aeroshell leading edge to permit aeroshell deployment mechanisms 87 to initiate their first stage of actuation.

FIG. 20 shows the vehicle in its fully deployed configuration (analogous to FIGS. 3 and 4). As previously described, aeroshell 97 can either be made of an all-inflatable high temperature fabric; a hybrid of fabric and high temperature lightweight composite stiffeners, and/or a series of high temperature tolerant rigid panels that can change shape as a result of operation of actuator means 95. As previously described, the design intent of the invention is to have the vehicle center of mass 93 be always forward of the aerodynamic center of pressure 89 in the direction of instantaneous velocity vector 119.

Figure 21:
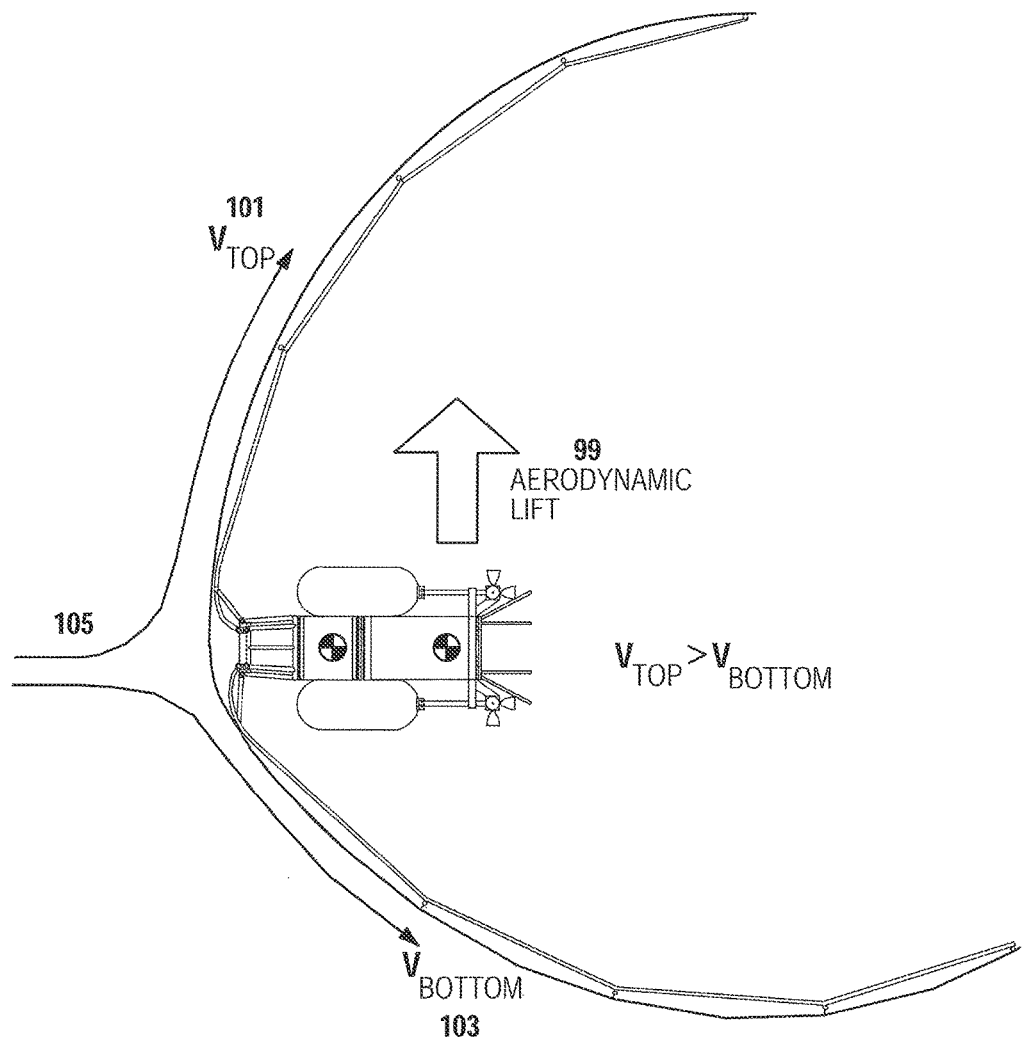
FIG. 21 is a side view of an embodiment of the present invention depicting cross range maneuvering via active vehicle geometry morphing in full 3D.

In FIG. 21, the aeroshell of the reentry vehicle of the present invention is fully deployed. Cross range maneuvering via active vehicle geometry morphing occurs in full 3D. The active morphing (which changes the vehicle L/D ratio) achieves this via actuator-controlled deformations, e.g., rear aileron/speed brake flaps (see e.g., in FIGS. 3 and 5); and vehicle core center of gravity (CG) shifting.

FIG. 21 shows a cross section typical of any of the variations of the invention in which active vehicle geometry morphing is underway. By changing the shape of the vehicle on one side and not the other the side with the greater curvature 101 will experience fluid flow in the atmosphere that is greater than the freestream velocity 105 and greater than that for a segment of the vehicle 103 where the surface curvature is less, in a fashion entirely analogous to that of the well-known operation of an airplane wing. Importantly, unlike the operation of an airplane wing, which is a rigid object that is rigidly attached to the aerodynamic body and generates vertical (upward) lift to keep the plane in flight, the invention described herein allows such lift to be generated in any arbitrary direction perpendicular to the vehicles forward velocity vector 119 by means of the distributed actuator frames and independent actuator modules described in FIGS. 3, 4, and 5, and in FIGS. 6 and 7, respectively. The use of vehicle core translational stage 83 (FIGS. 29, 30) allows the vehicle control system an additional level of control wherein the entire morphed vehicle can be rotated about a point near the leading edge to effect greater or lesser lift for a particular geometric configuration of the vehicle.

Figure 22A:
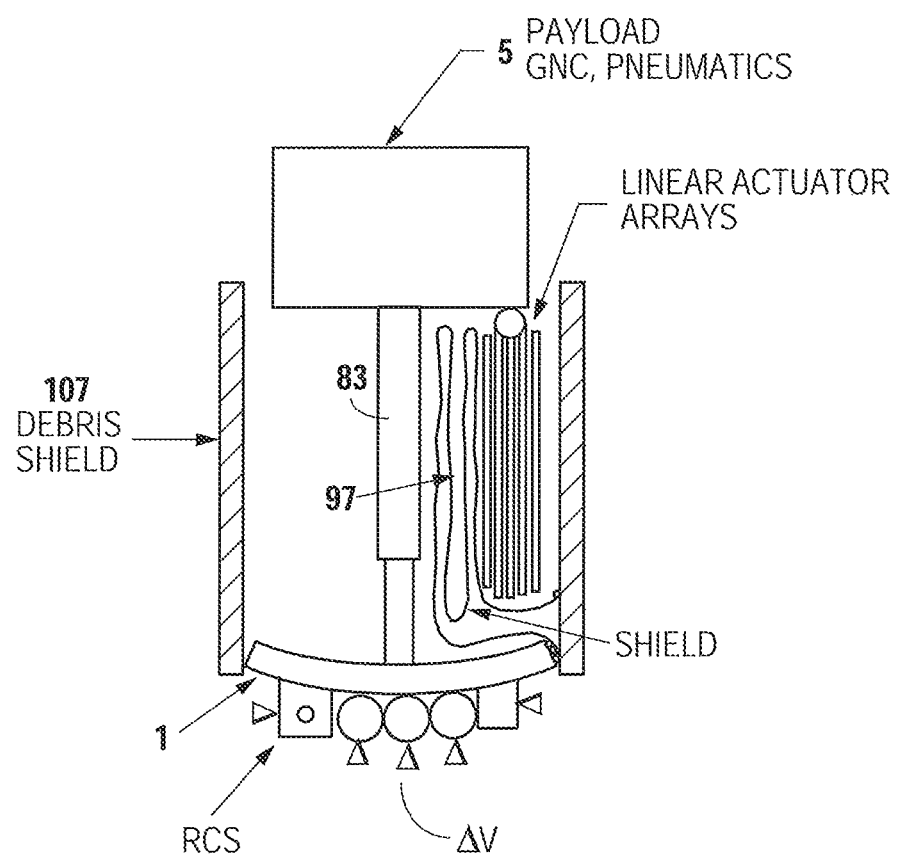
FIG. 22A is a side view of an embodiment of the present invention with respect to FIGS. 3 and 4 in its stowed configuration with external debris shield shell and showing jettisonable deorbit burn and attitude control system at bottom.
Figure 22B:
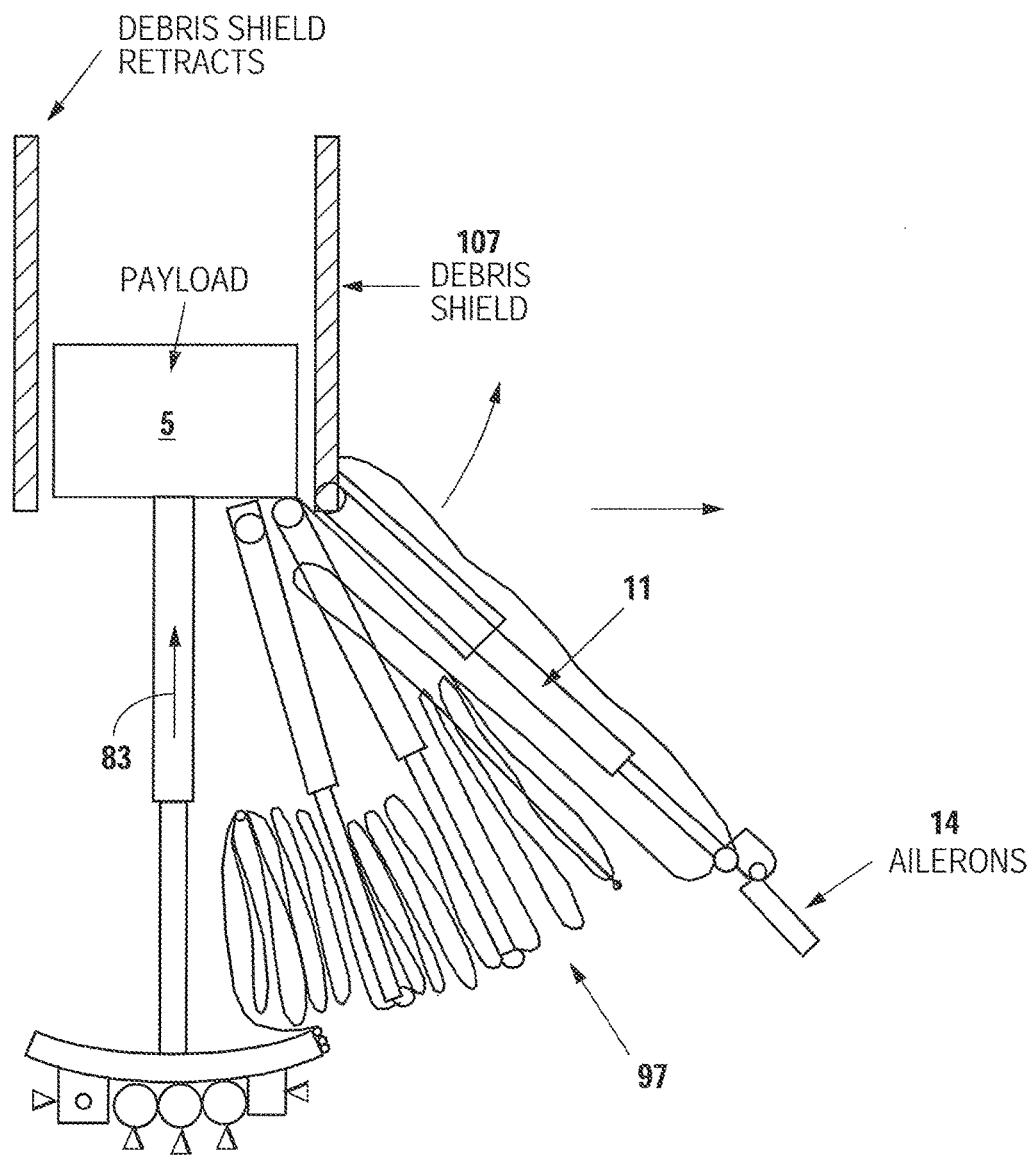
FIG. 22B is a side view of an embodiment of the present invention with respect to FIG. 4 depicting the initial actuator mechanism deploying the all-fabric aeroshell.
Figure 22C:
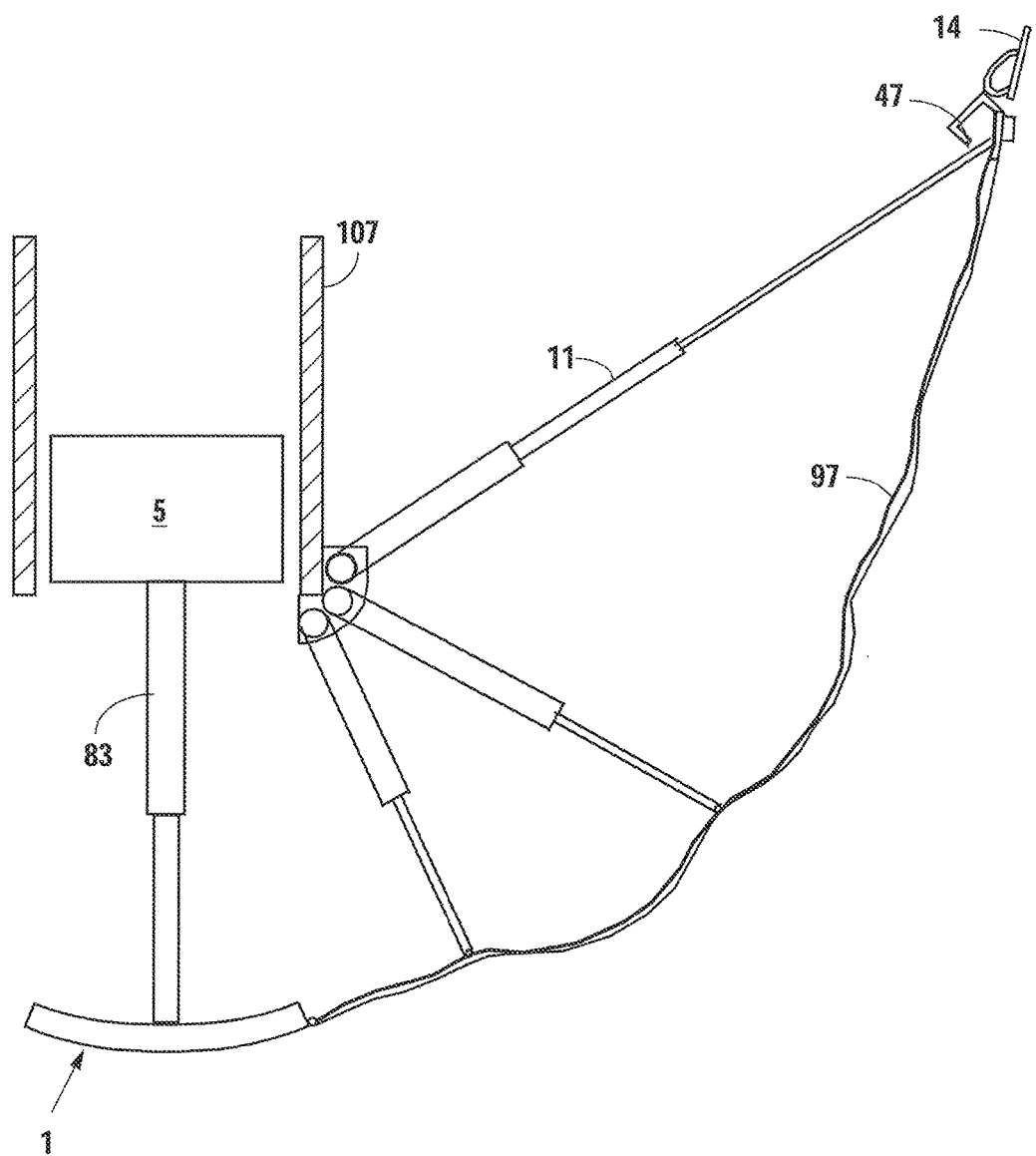
FIG. 22C is a partial side view of an embodiment of the present invention with respect to FIG. 4 showing the final actuator mechanism position after deploying the all-fabric aeroshell.
Figure 22D:
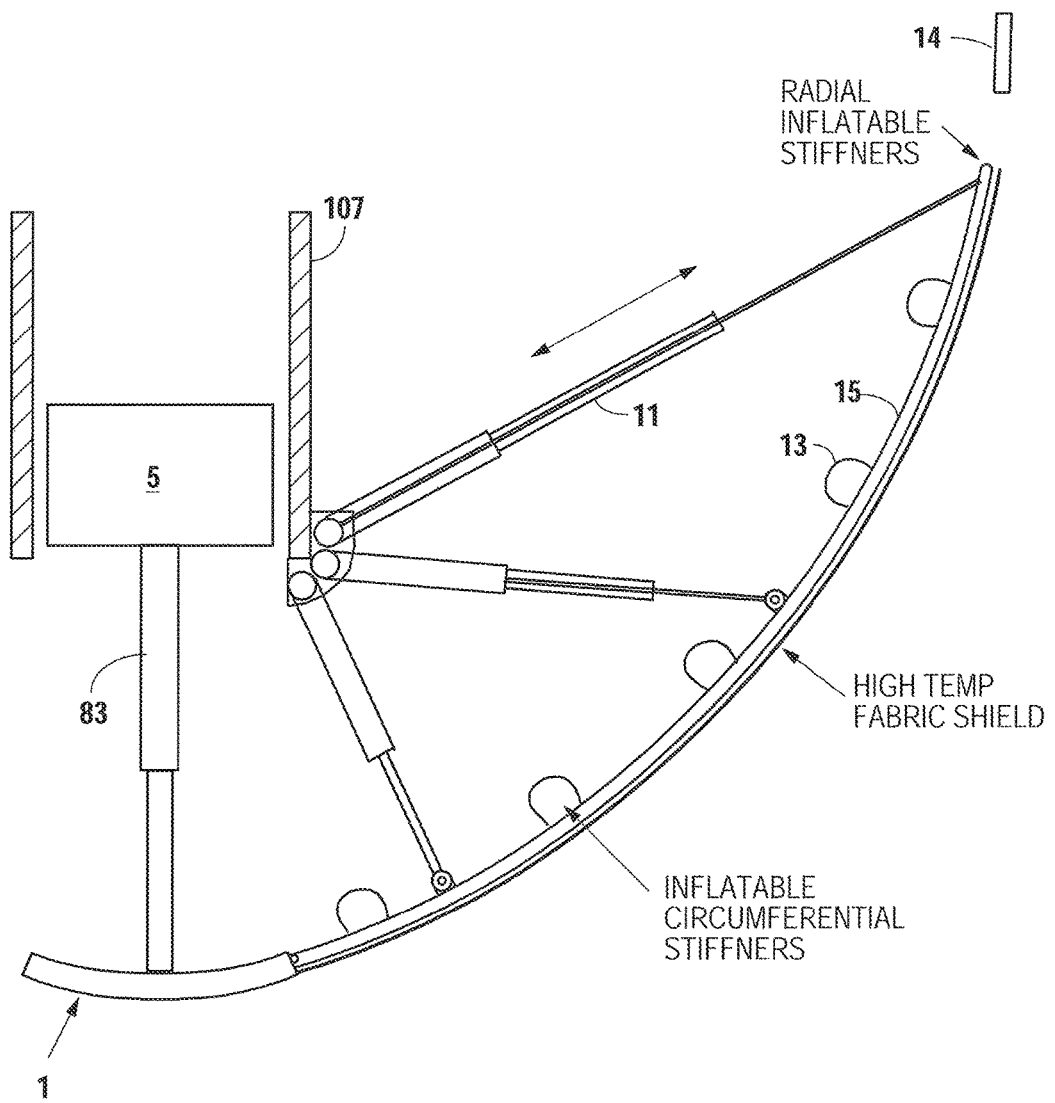
FIG. 22D is a partial side view of an embodiment of the present invention with respect to FIG. 3 depicting the final actuator mechanism position after deploying the inflation-stiffened fabric aeroshell.
Figure 22C:
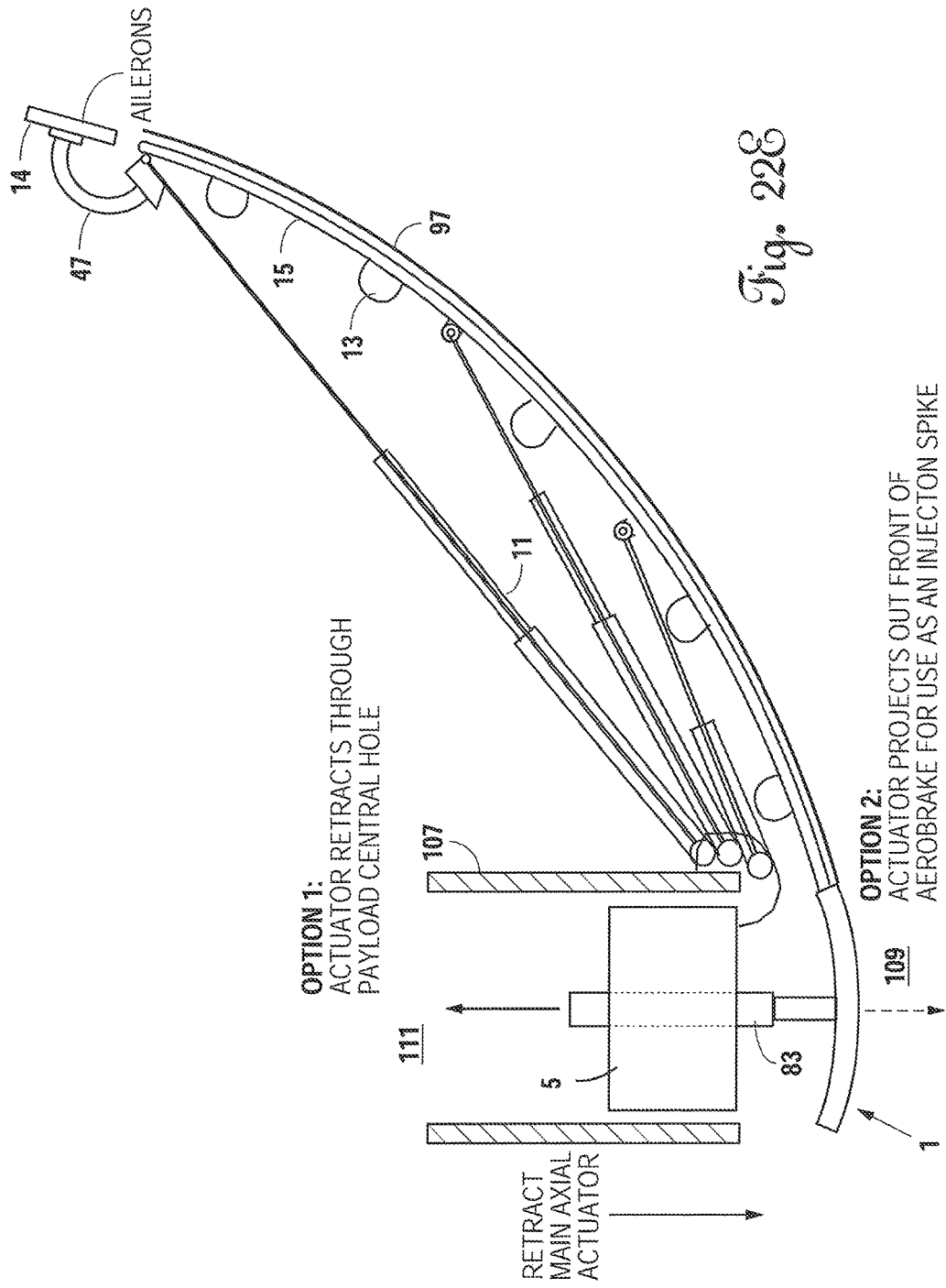

Referring now to FIGS. 22A-E, the deployment sequence for the invention variants are depicted with respect to FIGS. 3 and 4, starting from the initial stowed configuration with respect to FIGS. 1 and 2. FIG. 22A is a side view of an embodiment of the present invention with respect to FIGS. 3 and 4 in its stowed configuration with external debris shield shell and showing jettisonable deorbit burn and attitude control system at bottom. FIG. 22B is a side view of an embodiment of the present invention with respect to FIG. 4 depicting the initial actuator mechanism deploying the all-fabric aeroshell. FIG. 22C is a partial side view of an embodiment of the present invention with respect to FIG. 4 showing the final actuator mechanism position after deploying the all-fabric aeroshell. FIG. 22D is a partial side view of an embodiment of the present invention with respect to FIG. 3 depicting the final actuator mechanism position after deploying the inflation-stiffened fabric aeroshell. FIG. 22E shows a partial side view of an embodiment of the present invention showing the payload being retracted (through an axial translation means) towards the leading edge of the inside of the aeroshell to increase the separation between the center of gravity of the payload and the center of pressure of the aeroshell.

FIGS. 22A-E show alternate views of the deployment of the vehicle in preparation for reentry that more readily make apparent the utility of the vehicle core translation stage. In these figures debris shield 107 is an optional element that may advantageously be comprised of a multi-layer ultralight Whipple shield design for use in long term exterior storage of lifeboat versions of the invention. For smaller science payload return from Earth orbit the invention will be small enough to be stored inside protected modules of an orbiting facility or a spacecraft. The actuator stage 83 is shown extended in FIGS. 22A-E to allow for deployment mechanism means 11, 13, 15 to extend and make taught a flexible aeroshell 97 or to unfold a series of rigid petal segments (as shown in FIGS. 6-7].

The present invention involves various steps to successfully use an on-demand return of small scientific payloads from the ISS, including following a thorough flight readiness review "go" decision (including detailed procedures approval and confirmation that the weather and test conditions on the ground are acceptable). The general operation of the present invention includes the following: The ISS candidate downmass payload (or alternatively, an inert 1 kg substitute mass) is loaded into an airtight pressure capsule at the core of the invention. The reentry vehicle is enabled. For safety reasons this would likely involve manually enabling an onboard high pressure stored gas system (by opening redundant shut off valves) and throwing a high reliability power-up switch. The state vector (orbital elements from the ISS) for the launch coordinates of the vehicle is then loaded either wirelessly or via hardwired hookup to the station executive.

The vehicle is then loaded onto a stored energy CubeSat release mechanism such as on the Japanese Kibo module. The release mechanism is armed, the inner airlock door closed, the airlock to vacuum vented and the outer airlock door opened. The vehicle is then launched by activation of the stored energy (spring) deployment system or alternatively, via EVA or robotic arm deploy or other comparable deployment system.

The vehicle is allowed to travel to a specified minimum safe distance from ISS. The aeroshell deployment is then activated via wireless encrypted relay. Following verification of aeroshell deployment and GNC operation, the vehicle is authorized to perform an initial attitude alignment maneuver and thruster test in preparation for retro burn. For planning purposes, satcom and GPS networks are now confirmed as GO.

The invention will automatically generate a list of prioritized potential landing sites from a stored database of available landing sites and the predicted orbital alignment with those sites, using an onboard embedded version of STK/Astrogator. There will be a period of review by on-station personnel to select from the list and authorize reentry initiation in collaboration with the ground crew and government range managers.

The vehicle performs a final attitude alignment once the target and trajectory are known and, at the designated time, will retro fire using a high pressure cold gas thruster (HP-CGT) from the RCS system to achieve the calculated delta-V. The invention, as necessary, updates its state vector and actively initiates L/D changes (active maneuvering) to reduce landing zone circular error probable (CEP). The vehicle also reports its position in real time via satcom-link to the mission ground station throughout the mission to aid in recovery operations. ISS receives and relays invention uplink data throughout the flight for as long as ISS is in contact with the vehicle. The on-station personnel have multiple command centers for comprehensive mission control.

The various embodiments described herein may be used singularly or in conjunction with other similar devices. The present disclosure includes preferred or illustrative embodiments in which a system and method for emergency crew return and down-mass orbit is described. Alternative embodiments of such a system and method can be used in carrying out the invention as claimed and such alternative embodiments are limited only by the claims themselves. Other aspects and advantages of the present invention may be obtained from a study of this disclosure and the drawings, along with the appended claims.

I claim:

1. A system for emergency crew return and down-mass orbit comprising:
    a reentry vehicle having an axisymmetrical aeroshell and a stowable configuration and a deployed configuration;
    a high temperature resistant refractory fabric covering said aeroshell;
    a plurality of circumferential inflatable stiffeners connected to said aeroshell;
    a plurality of radial inflatable stiffeners connected to said aeroshell and said plurality of circumferential inflatable stiffeners;
    a multiple layer debris shield partially enclosing said aeroshell when said aeroshell is in said stowable configuration;
    a plurality of radially axisymmetric panels in an annular configuration, said plurality of radially axisymmetric panels defining the outer perimeter of said aeroshell when said aeroshell is in a deployed configuration;
    deployment mechanisms capable of morphing the shape of said aeroshell when said aeroshell is in said deployed configuration;
    a payload connected to said plurality of circumferential inflatable stiffeners, plurality of radially axisymmetric panels, and said deployment mechanisms;
    a plurality of actuating trailing edge control surfaces connected to one end of said plurality of radially axisymmetric panels;
    a plurality of control systems surrounding said payload; and
    wherein said system has a low ballistic coefficient and is stowed within a launch vehicle.

2. The system, as recited in claim 1, wherein said plurality of control systems provide guidance, navigation, and control, attitude and velocity change control thruster arrays, power, actuators, and stored energetics for operating the deployment mechanisms and inflight aeroshell morphing systems.

3. The system, as recited in claim 2, wherein said aeroshell is configured to form a convex shell of revolution when in said deployed configuration.

4. The system, as recited in claim 3, further comprising a plurality of actuators for actuating said plurality of actuating trailing edge control surfaces.

5. The system, as recited in claim 4, wherein said system removably anchors to a docking port of an orbiting space station.

6. The system, as recited in claim 5, wherein the flight path angle of said reentry vehicle is reduced by introducing lift through the use of the surface of said trailing actuator and active vehicle geometry morphing.

7. The system of claim 6, wherein said ballistic coefficient is in the range of between 1 and 20.

8. The system of claim 7, wherein said ballistic coefficient is in the range of between 5 and 10.

9. The system, as recited in claim 8, wherein said aeroshell is contiguous and forms an approximate shell of revolution approximately defined by spherical, paraboloidal, or elliptical shell segments in which said payload resides behind and within the leading edge of said aeroshell and specifically in which the center of gravity of said payload lies closer to said leading edge of said aeroshell than the center of aerodynamic pressure on said aeroshell.

10. The system, as recited in claim 8, wherein said aeroshell is discontiguous.

11. The system, as recited in claim 8, wherein said plurality of radially axisymmetric panels may be selectively extended independent of each other panel.

12. The system, as recited in claim 11, wherein said plurality of radially axisymmetric panels may be extended collectively.

13. The system, as recited in claim 12, wherein said payload is comprised of time sensitive results from biological and pharmaceutical manufacturing processes and experiments.

14. The system, as recited in claim 12, wherein said payload is comprised of on-demand emergency orbital lifeboat escape pods for one or several humans operating from an orbiting space vehicle or an orbiting facility.

15. The system, as recited in claim 12, wherein said payload is comprised of industrial aerobraking return of commodity materials from interplanetary and cis-lunar space to Earth orbit.

\* \* \* \* \*